US012809073B2

(12) United States Patent
Wu et al.

(10) Patent No.: US 12,809,073 B2
(45) Date of Patent: Nov. 24, 2026

(54) STRUCTURAL COLOR MULTILAYER STRUCTURES HAVING BARRIER LAYERS

(71) Applicant: Toyota Motor Engineering & Manufacturing North America, Inc., Plano, TX (US)

(72) Inventors: Songtao Wu, Ann Arbor, MI (US); Debasish Banerjee, Ann Arbor, MI (US); Minjuan Zhang, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 764 days.

(21) Appl. No.: 18/116,600

(22) Filed: Mar. 2, 2023

(65) Prior Publication Data

US 2024/0077662 A1 Mar. 7, 2024

Related U.S. Application Data

(60) Provisional application No. 63/404,413, filed on Sep. 7, 2022.

(51) Int. Cl.
*G02B 5/28* (2006.01)

(52) U.S. Cl.
CPC .................................. *G02B 5/285* (2013.01)

(58) Field of Classification Search
None
See application file for complete search history.

(56) References Cited

U.S. PATENT DOCUMENTS

| | | | |
|---|---|---|---|
| 3,247,392 | A | 4/1966 | Thelen |
| 3,650,790 | A | 3/1972 | Klenke et al. |
| 3,769,515 | A | 10/1973 | Clark, Jr. |
| 3,885,408 | A | 5/1975 | Clark, Jr. |
| 3,910,681 | A | 10/1975 | Elliott et al. |
| 3,953,643 | A | 4/1976 | Cheung et al. |
| 4,079,605 | A | 3/1978 | Bartels |
| 4,449,126 | A | 5/1984 | Pekker |
| 4,525,028 | A | 6/1985 | Dorschner |
| 4,544,415 | A | 10/1985 | Franz et al. |
| 4,556,599 | A | 12/1985 | Sato et al. |

(Continued)

FOREIGN PATENT DOCUMENTS

| | | | |
|---|---|---|---|
| AU | 4898500 | A | 2/2001 |
| AU | 2005202375 | A1 | 6/2005 |

(Continued)

OTHER PUBLICATIONS

Schmid, Raimund and Mronga, Norbert, "A New Generation of Sparkling Effect Pigments", Paint & Coatings Industry; Oct. 2004, vol. 20 Issue 10, p. 118-121.

(Continued)

*Primary Examiner* — Jeffrey D Washville
(74) *Attorney, Agent, or Firm* — DINSMORE & SHOHL LLP

(57) ABSTRACT

A multilayer structure that reflects color having a core layer and a conformal dielectric layer encapsulating the core layer. A conformal barrier layer encapsulates the conformal dielectric layer, and a conformal absorber layer encapsulates the conformal barrier layer.

19 Claims, 9 Drawing Sheets

(56) References Cited

U.S. PATENT DOCUMENTS 4,613,622 A 9/1986 Moeller et al.
4,643,518 A 2/1987 Taniguchi
4,673,914 A 6/1987 Lee
4,705,839 A 11/1987 Martin
4,714,308 A 12/1987 Sawamura et al.
4,753,829 A 6/1988 Panush
4,756,602 A 7/1988 Southwell et al.
4,868,559 A 9/1989 Pinnow
4,896,928 A 1/1990 Perilloux et al.
4,930,866 A 6/1990 Berning et al.
4,996,105 A 2/1991 Oyama et al.
5,007,710 A 4/1991 Nakajima et al.
5,043,593 A 8/1991 Tsutsumi et al.
RE33,729 E 10/1991 Perilloux
5,132,661 A 7/1992 Pinnow
5,138,468 A 8/1992 Barbanell
5,183,700 A 2/1993 Austin
5,214,530 A 5/1993 Coombs et al.
5,245,329 A 9/1993 Gokcebay
5,279,657 A 1/1994 Phillips et al.
5,283,431 A 2/1994 Rhine
5,323,416 A 6/1994 Bhat et al.
5,410,431 A 4/1995 Southwell
5,423,912 A 6/1995 Sullivan et al.
5,424,119 A 6/1995 Phillips et al.
5,437,931 A 8/1995 Tsai et al.
5,472,798 A 12/1995 Kumazawa et al.
5,491,470 A 2/1996 Veligdan
5,522,923 A 6/1996 Kimura et al.
5,543,665 A 8/1996 Demarco
5,561,420 A 10/1996 Kleefeldt et al.
5,569,332 A 10/1996 Glatfelter et al.
5,569,353 A 10/1996 Zodrow
5,569,535 A 10/1996 Phillips et al.
5,570,847 A 11/1996 Phillips et al.
5,571,624 A 11/1996 Phillips et al.
5,624,486 A 4/1997 Schmid et al.
5,653,792 A 8/1997 Phillips et al.
5,691,844 A 11/1997 Oguchi et al.
5,700,550 A 12/1997 Uyama et al.
5,759,255 A 6/1998 Venturini et al.
5,768,026 A 6/1998 Kiyomoto et al.
5,850,309 A 12/1998 Shirai et al.
5,889,603 A 3/1999 Roddy et al.
5,982,078 A 11/1999 Krisl et al.
6,049,419 A 4/2000 Wheatley et al.
6,055,079 A 4/2000 Hagans et al.
6,130,780 A 10/2000 Joannopoulos et al.
6,150,022 A 11/2000 Coulter et al.
6,156,115 A 12/2000 Pfaff et al.
6,157,480 A 12/2000 Anderson et al.
6,157,489 A 12/2000 Bradley, Jr. et al.
6,157,498 A 12/2000 Takahashi
6,164,777 A 12/2000 Li et al.
6,180,025 B1 1/2001 Schoenfeld et al.
6,215,592 B1 4/2001 Pelekhaty
6,242,056 B1 6/2001 Spencer et al.
6,243,204 B1 6/2001 Bradley, Jr. et al.
6,246,523 B1 6/2001 Bradley, Jr. et al.
6,249,378 B1 6/2001 Shimamura et al.
6,310,905 B1 10/2001 Shirai
6,331,914 B1 12/2001 Wood, II et al.
6,383,638 B1 5/2002 Coulter et al.
6,387,457 B1 5/2002 Jiang et al.
6,387,498 B1 5/2002 Coulter et al.
6,399,228 B1 6/2002 Simpson
6,433,931 B1 8/2002 Fink et al.
6,451,414 B1 9/2002 Wheatley et al.
6,475,273 B1 11/2002 Zimmermann et al.
6,534,903 B1 3/2003 Spiro et al.
6,565,770 B1 5/2003 Mayer et al.
6,569,527 B1 5/2003 Calhoun et al.
6,574,383 B1 6/2003 Erchak et al.
6,582,764 B2 6/2003 Fuller et al.
6,596,070 B1 7/2003 Schmidt et al.
6,618,149 B1 9/2003 Stirton
6,624,945 B2 9/2003 Fan et al.
6,667,095 B2 12/2003 Wheatley et al.
6,686,042 B1 2/2004 LeGallee
6,699,313 B2 3/2004 Coulter et al.
6,753,952 B1 6/2004 Lawrence et al.
6,841,238 B2 1/2005 Argoitia et al.
6,844,976 B1 1/2005 Firon et al.
6,873,393 B2 3/2005 Ma
6,887,526 B1 5/2005 Arlt et al.
6,894,838 B2 5/2005 Mizrahi et al.
6,903,873 B1 6/2005 Joannopoulos et al.
6,913,793 B2 7/2005 Jiang et al.
6,927,900 B2 8/2005 Liu et al.
6,997,981 B1 2/2006 Coombs et al.
7,049,003 B2 5/2006 Thomsen et al.
7,052,762 B2 5/2006 Hebrink et al.
7,064,897 B2 6/2006 Hebrink et al.
7,098,257 B2 8/2006 Rink et al.
7,106,516 B2 9/2006 Lotz et al.
7,123,416 B1 10/2006 Erdogan et al.
7,141,297 B2 11/2006 Condo et al.
7,169,472 B2 1/2007 Raksha et al.
7,184,133 B2 2/2007 Coombs et al.
7,190,524 B2 3/2007 Grawert et al.
7,215,473 B2 5/2007 Fleming
7,236,296 B2 6/2007 Liu et al.
7,267,386 B2 9/2007 Hesch
7,326,967 B2 2/2008 Hsieh et al.
7,329,967 B2 2/2008 Nozawa et al.
7,352,118 B2 4/2008 Chowdhury et al.
7,367,691 B2 5/2008 Lin
7,410,685 B2 8/2008 Rosenberger et al.
7,413,599 B2 8/2008 Henglein et al.
7,446,142 B2 11/2008 Meisenburg et al.
7,452,597 B2 11/2008 Bujard
7,483,212 B2 1/2009 Cho et al.
7,638,184 B2 12/2009 Yaoita et al.
7,667,895 B2 2/2010 Argoitia et al.
7,699,350 B2 4/2010 Heim
7,699,927 B2 4/2010 Henglein et al.
7,745,312 B2 6/2010 Herner et al.
7,847,342 B2 12/2010 Fukuzumi et al.
7,851,580 B2 12/2010 Li et al.
7,859,754 B2 12/2010 Falicoff
7,863,672 B2 1/2011 Jin et al.
7,903,339 B2 3/2011 Banerjee et al.
7,929,730 B2 4/2011 Huang et al.
7,980,711 B2 7/2011 Takayanagi et al.
8,013,383 B2 9/2011 Kidoh et al.
8,257,784 B2 9/2012 Grayson et al.
8,313,798 B2 11/2012 Nogueira et al.
8,323,391 B2 12/2012 Banerjee et al.
8,329,247 B2 12/2012 Banerjee et al.
8,350,314 B2 1/2013 Fukuzumi et al.
8,440,014 B2 5/2013 Kitamura et al.
8,446,666 B2 5/2013 Kurt et al.
8,542,441 B2 9/2013 Ouderkirk et al.
8,593,728 B2 11/2013 Banerjee et al.
8,599,464 B2 12/2013 Park
8,619,365 B2 12/2013 Harris et al.
8,736,959 B2 5/2014 Grayson et al.
9,063,291 B2 6/2015 Banerjee et al.
2001/0022151 A1 9/2001 Sliwinski et al.
2002/0030882 A1 3/2002 Vitt et al.
2002/0096087 A1 7/2002 Glausch
2002/0117080 A1 8/2002 Okutsu et al.
2002/0129739 A1 9/2002 Yanagimoto et al.
2003/0002157 A1 1/2003 Someno
2003/0059549 A1 3/2003 Morrow et al.
2003/0190473 A1 10/2003 Argoitia et al.
2004/0047055 A1 3/2004 Mizrahi et al.
2004/0156984 A1 8/2004 Vitt et al.
2004/0179267 A1 9/2004 Moon et al.
2004/0191540 A1 9/2004 Jakobi et al.
2004/0246477 A1 12/2004 Moon et al.
2004/0252509 A1 12/2004 Lin
2004/0263983 A1 12/2004 Acree
2004/0265477 A1 12/2004 Nabatova-Gabain et al.

(56) References Cited

U.S. PATENT DOCUMENTS

| | | | |
|---|---|---|---|
| 2005/0126441 | A1 | 6/2005 | Skelhorn |
| 2005/0127840 | A1 | 6/2005 | Chowdhury et al. |
| 2005/0132929 | A1 | 6/2005 | Raksha et al. |
| 2005/0152417 | A1 | 7/2005 | Lin |
| 2005/0235714 | A1 | 10/2005 | Lindstrom |
| 2005/0264874 | A1 | 12/2005 | Lin |
| 2006/0006402 | A1 | 1/2006 | Hsieh et al. |
| 2006/0023327 | A1 | 2/2006 | Coombs et al. |
| 2006/0030656 | A1 | 2/2006 | Tarng et al. |
| 2006/0081858 | A1 | 4/2006 | Lin et al. |
| 2006/0145172 | A1 | 7/2006 | Su et al. |
| 2006/0155007 | A1 | 7/2006 | Huber |
| 2006/0159922 | A1 | 7/2006 | O'Keefe |
| 2006/0222592 | A1 | 10/2006 | Burda |
| 2007/0097509 | A1 | 5/2007 | Nevitt et al. |
| 2007/0221097 | A1 | 9/2007 | Tarng et al. |
| 2007/0259182 | A1* | 11/2007 | Bujard .................... C09C 1/642 106/404 |
| 2009/0046368 | A1 | 2/2009 | Banerjee et al. |
| 2009/0082659 | A1 | 3/2009 | Ham et al. |
| 2009/0153953 | A1 | 6/2009 | Banerjee et al. |
| 2009/0161220 | A1 | 6/2009 | Banerjee et al. |
| 2009/0196319 | A1 | 8/2009 | Hori et al. |
| 2009/0241802 | A1 | 10/2009 | Nemoto et al. |
| 2009/0303044 | A1 | 12/2009 | Furuichi et al. |
| 2009/0318614 | A1 | 12/2009 | Chevalier |
| 2009/0321693 | A1 | 12/2009 | Ohkuma et al. |
| 2010/0064938 | A1 | 3/2010 | Voit et al. |
| 2010/0208338 | A1 | 8/2010 | Banerjee et al. |
| 2010/0209593 | A1 | 8/2010 | Banerjee et al. |
| 2010/0213485 | A1 | 8/2010 | McKenzie et al. |
| 2011/0014366 | A1 | 1/2011 | Nogueira et al. |
| 2011/0091658 | A1 | 4/2011 | Banerjee et al. |
| 2011/0113984 | A1 | 5/2011 | Fuller, Jr. et al. |
| 2011/0128616 | A1 | 6/2011 | Banerjee et al. |
| 2011/0134515 | A1 | 6/2011 | Banerjee et al. |
| 2011/0214733 | A1 | 9/2011 | den Boer et al. |
| 2011/0228399 | A1 | 9/2011 | Ohnishi |
| 2011/0266879 | A1 | 11/2011 | Kim et al. |
| 2011/0267247 | A1 | 11/2011 | Choi et al. |
| 2011/0299154 | A1 | 12/2011 | Grayson et al. |
| 2012/0015056 | A1 | 1/2012 | Lee |
| 2012/0050848 | A1 | 3/2012 | Carlson et al. |
| 2012/0107584 | A1 | 5/2012 | Eibon et al. |
| 2012/0153527 | A1 | 6/2012 | Banerjee et al. |
| 2012/0307369 | A1 | 12/2012 | Banerjee et al. |
| 2013/0119298 | A1 | 5/2013 | Raksha et al. |
| 2013/0148221 | A1 | 6/2013 | Banerjee et al. |
| 2013/0213260 | A1 | 8/2013 | Kunii |
| 2013/0250403 | A1 | 9/2013 | Maeda |
| 2013/0265668 | A1* | 10/2013 | Banerjee .............. G02B 5/0825 359/885 |
| 2014/0018439 | A1 | 1/2014 | Gruner et al. |
| 2014/0111861 | A1 | 4/2014 | Banerjee et al. |
| 2014/0133045 | A9 | 5/2014 | Banerjee et al. |
| 2014/0211303 | A1* | 7/2014 | Banerjee ................ G02B 5/085 359/359 |
| 2014/0368918 | A1 | 12/2014 | Banerjee et al. |
| 2015/0033988 | A1 | 2/2015 | Wu et al. |
| 2015/0116856 | A1 | 4/2015 | Lee et al. |
| 2015/0138641 | A1 | 5/2015 | Delst et al. |
| 2015/0138642 | A1 | 5/2015 | Banerjee et al. |
| 2015/0309231 | A1 | 10/2015 | Banerjee |
| 2015/0309232 | A1 | 10/2015 | Banerjee |
| 2020/0003939 | A1 | 1/2020 | Banerjee et al. |
| 2020/0103560 | A1* | 4/2020 | Wu .......................... G02B 1/14 |

FOREIGN PATENT DOCUMENTS

| | | | |
|---|---|---|---|
| CA | 2550190 | A1 | 12/2006 |
| CN | 1132773 | A | 10/1996 |
| CN | 1217734 | A | 5/1999 |
| CN | 1313953 | A | 9/2001 |
| CN | 1425046 | A | 6/2003 |
| CN | 1471562 | A | 1/2004 |
| CN | 1527100 | A | 9/2004 |
| CN | 1202429 | C | 5/2005 |
| CN | 1622981 | A | 6/2005 |
| CN | 1637078 | A | 7/2005 |
| CN | 1741246 | A | 3/2006 |
| CN | 1823023 | A | 8/2006 |
| CN | 1930599 | A | 3/2007 |
| CN | 101027365 | A | 8/2007 |
| CN | 101059573 | A | 10/2007 |
| CN | 101105547 | A | 1/2008 |
| CN | 101288007 | A | 10/2008 |
| CN | 101396884 | A | 4/2009 |
| CN | 101619176 | A | 1/2010 |
| CN | 101765791 | A | 6/2010 |
| CN | 101883826 | A | 11/2010 |
| CN | 102132214 | A | 7/2011 |
| CN | 102627874 | A | 8/2012 |
| CN | 102741358 | A | 10/2012 |
| CN | 102803174 | A | 11/2012 |
| CN | 103502333 | A | 1/2014 |
| CN | 103507322 | A | 1/2014 |
| CN | 103513316 | A | 1/2014 |
| CN | 103874939 | A | 6/2014 |
| CN | 203849448 | U | 9/2014 |
| CN | 104380150 | A | 2/2015 |
| CN | 104619668 | A | 5/2015 |
| CN | 104730737 | A | 6/2015 |
| CN | 103402117 | B | 8/2015 |
| DE | 2106613 | A1 | 8/1971 |
| DE | 19823732 | A1 | 12/1999 |
| DE | 102014119261 | A1 | 6/2015 |
| EP | 141143 | B1 | 5/1985 |
| EP | 0927371 | B1 | 7/1999 |
| EP | 1937781 | B1 | 12/2009 |
| EP | 1499568 | B1 | 12/2012 |
| EP | 2910985 | A1 | 8/2015 |
| JP | H0246366 | A | 2/1990 |
| JP | H0312605 | A | 1/1991 |
| JP | H05241017 | A | 9/1993 |
| JP | H06016965 | A | 1/1994 |
| JP | H06118229 | A | 4/1994 |
| JP | 07034324 | | 2/1995 |
| JP | H7-268241 | A | 10/1995 |
| JP | H07258579 | A | 10/1995 |
| JP | H8-259840 | A | 10/1996 |
| JP | H10202813 | A | 8/1998 |
| JP | H1112489 | A | 1/1999 |
| JP | H11101913 | A | 4/1999 |
| JP | H11504953 | A | 5/1999 |
| JP | 2000220331 | A | 8/2000 |
| JP | 2000329933 | A | 11/2000 |
| JP | 2002080749 | A | 3/2002 |
| JP | 2002090522 | A | 3/2002 |
| JP | 2003050311 | A | 2/2003 |
| JP | 2003053875 | A | 2/2003 |
| JP | 2003329824 | A | 11/2003 |
| JP | 2004505158 | A | 2/2004 |
| JP | 2004134743 | A | 4/2004 |
| JP | 2004510013 | A | 4/2004 |
| JP | 2004512394 | A | 4/2004 |
| JP | 2004233500 | A | 8/2004 |
| JP | 2005513207 | A | 5/2005 |
| JP | 2005144925 | A | 6/2005 |
| JP | 2006506518 | A | 2/2006 |
| JP | 2006097426 | A | 4/2006 |
| JP | 3799696 | B2 | 7/2006 |
| JP | 2006193738 | A | 7/2006 |
| JP | 2006285196 | A | 10/2006 |
| JP | 2007065232 | A | 3/2007 |
| JP | 2007510022 | A | 4/2007 |
| JP | 2007133325 | A | 5/2007 |
| JP | 2007183525 | A | 7/2007 |
| JP | 2008038382 | A | 2/2008 |
| JP | 2008508404 | A | 3/2008 |
| JP | 2008510866 | A | 4/2008 |
| JP | 2008526002 | A | 7/2008 |
| JP | 2008191592 | A | 8/2008 |
| JP | 2008209520 | A | 9/2008 |

(56) References Cited

FOREIGN PATENT DOCUMENTS

| | | | |
|---|---|---|---|
| JP | 2008230218 | A | 10/2008 |
| JP | 2008257777 | A | 10/2008 |
| JP | 2009042763 | A | 2/2009 |
| JP | 2009511725 | A | 3/2009 |
| JP | 2010502433 | A | 1/2010 |
| JP | 2010526015 | A | 7/2010 |
| JP | 2010191431 | A | 9/2010 |
| JP | 4948706 | B2 | 6/2012 |
| JP | 2013518946 | A | 5/2013 |
| JP | 2014237819 | A | 12/2014 |
| JP | 2015120350 | A | 7/2015 |
| JP | 2016027095 | A | 2/2016 |
| JP | 2016049777 | A | 4/2016 |
| TW | 200417759 | A | 9/2004 |
| TW | 201013236 | A | 4/2010 |
| WO | 9936258 | A1 | 1/1999 |
| WO | 99/42892 | A1 | 8/1999 |
| WO | 0012634 | A1 | 3/2000 |
| WO | 2000/022466 | A1 | 4/2000 |
| WO | 0031571 | A1 | 6/2000 |
| WO | 02054030 | A2 | 7/2002 |
| WO | 03062871 | A1 | 7/2003 |
| WO | 2003062871 | A1 | 7/2003 |
| WO | 2015153043 | A1 | 10/2015 |

OTHER PUBLICATIONS

Sajeev John et al., "Photonic Band Gap Materials: A Semiconductor for Light", Department of Physics, University of Toronto, p. 1-23; 2001.
Distributed Bragg Reflector; en.wikipedia.org/wiki/Bragg_reflector (2005).
Photonic Crystal; en.wikipedia.org/wiki/Photonic_crystals (2003).
Tikhonravov, et al., "Application Of The Needle Optimization Technique To The Design Of Optical Coatings", Applied Optics, Optical Society of America, 1996, pp. 5493-5508, vol. 35, No. 28.
Tikhonravov, Alexander V. et al., "Optical Coating Design Algorithm Based on the Equivalent Layers Theory", Applied Optics: vol. 45, No. 7; Mar. 2006; pp. 1530-1538.
Kaminska, Kate et al., "Birefringent Omnidirectional Reflector", Applied Optics, vol. 43, No. 7, Mar. 2004, pp. 1570-1576.
Deopura, M. "Dielectric Omnidirectional Visible Reflector," Optics Letters, Aug. 1, 2001, vol. 16, No. 15.
Bing-Xin Wei et al., "Detrimental Thixotropic Thinning of Filter Cake of SiO2-AI2O3 Composite Coaled TiO2 Particles and Its Control", Industrial & Engineering Chemistry Research, Sep. 27, 2011, 50, pp. 13799-13804.
Hongqiang et al, "Disordered dielectric high reflectors with broadband from visible to infrared," Applied Physics Letters, American Institute of Physics, Melville, NY, US, vol. 74, No. 22, dated May 31, 2009.
Xifre-Perez et al, "Porous silicon mirrors with enlarged omnidirectional band gap," Journal of Applied Physics, American Institute of Physics, Melville, NY, US, vol. 97, No. 6, dated Mar. 9, 2005.
"Laser 2000 Gmbttp:/ /www. laser2000. de/fileadm in/Produkdaten/ SK_WEB/Datenblaetter_S Em/S Em Rock-Stopline-Notchfilter. pdf, accessed Feb. 2, 2010".
Bendiganavale A.K., Malshe, V.C., "Infrared Reflective Inorganic Pigments", Recent Patents On Chemical Engineering, 2008, 1, 67-79.
D.P. Young, Jr., et al. "Comparison of Avian Responses to UV-Light Reflective Paint on Wind Turbines," National Renewable Energy Laboratory, Subcontract Report, Jan. 2003.
Maier, E.J. "To Deal With the Invisible": On the biological significance of ultraviolet sensitivity in birds. Naturwissenschaften 80: 476-478, 1993.
Nixon, J., "Twinkle, Twinkle Little Star," Asia Pacific Coating Journal, Feb. 2004.
Fink, Joel "A Dielectric Omnidirectional Reflector", E.L. Thomas, Science, vol. 282, Nov. 27 (1988).
Lin, Wei Hua, "Design and Fabrication of Omnidirectional Reflectors in the Visible Range" Journal of Modern Optics, vol. 52, No. 8, 1155 (2005).
Chen, Kevin M. "Si02/Ti02 Omnidirectional Reflector and Microcavity Resonator Via the Sol-Gel Method", Appl. Phys. Lett., vol. 75, No. 24, Dec. 13, 1999.
Almedia, R.M., "Photonic Bandgap Materials and Structures by Sol-Gel Processing", Journal of Non-Crystalline Solids, 405-499 (2003).
Decourby, R.G., "Planar Omnidirectional Reflectors in Chalcogenide Glass and Polymer" Optics Express, 6228, Aug. 8, 2005.
Clement, T.J., "Improved Omnidirectional Reflectors in Chalcogenide Glass and Polymer by Using the Silver Doping Technique", Optics Express, 14, 1789 (2006).
Bryant, A., "All-Silicon Omnidirectional Mirrors Based on One-Dimensional Crystals", Appl. Phys. Lett. vol. 82, No. 19, May 12, 2003.
Chigrin, D.N., "Observation of Total Omnidirectional Reflection From a One-Dimensional Dielectric Lattice", Appl. Phys. A. 68, 25-28 (1999).
Park, Y., "GaAs-based Near-infrared Omnidirectional Reflector", Appl. Phys. Lett., vol. 82, No. 17, Apr. 28, 2003.
H-Y Lee, "Design and Evaluation of Omnidirectional One-Dimensional Photonic Crystals", Journal of Appl. Phys. vol. 93, No. 2, Jan. 15, 2003.
Banerjee, Debasish, "Narrow-band Omnidirectional Structural Color", SAE World Congress 01-1049 (2008).
M. Deopura et al., Dielectric Omnidirectional Visible Reflector; Optical Society of America; vol. 26, No. 15; Department of Material Science and Engineering, Massachusetts Institute of Technology; pp. 1197-1199.
Chinese office action for application 202010092655.1 mail date Jun. 3, 2021 (107 pages with English translation).
Chinese office action for application 202010092655.1 mail date Nov. 22, 2021 (10 pages with English translation).
Chinese office action for application 202010215691.2 mail date Jul. 16, 2021 (23 pages with English translation).
Chinese office action for application 202010215691.2 mail date Dec. 13, 2021 (13 pages with English translation).
Chinese office action for application 202010402572.8 mail date Jul. 21, 2021 (13 pages with English translation).
Chinese office action for application 202010402572.8 mail date Dec. 30, 2021 (16 pages with English translation).
Chinese office action for application 202010927458.7 mail date Sep. 15, 2021 (10 pages with English translation).
Chinese office action for application 202010927458.7 mail date Jan. 19, 2022 (13 pages with English translation).
Optical Thin Film Technology, Lu Jinjun, Liu Weiguo, Northwestern Polytechnical University Press, pp. 181-187, Oct. 2015.
Varieties and Application of Organic Pigments, Shen Yongjia, Chemical Industry Press, pp. 486-490, Jul. 2001.
Handbook of Inorganic Fine Chemicals, Le Zhiqiang, Tianjin Chemical Industry Research and Design Institute, Chemical Industry Press, pp. 1209-1212, Jan. 2001.
Japanese office action for application 2020-105083 mail date Sep. 7, 2021 (14 pages with English Translation).
Japanese office action for application 2020-105083 mail date May 10, 2022 (5 pages with English Translation).
Chinese office action for application 202010173026.1 mail date Oct. 8, 2022 (6 pages with English Translation).
Japanese office action for application 2022-059572 mail date Feb. 16, 2023 (10 pages with English Translation).
German office action for application 10 2015 112 412.2 mail date Mar. 13, 2023 (13 pages with English Translation).
Zhao, Y. [et al.]: Nanostructured Nb2O5 catalysts. In: Nano Reviews, vol. 3, 2012, No. 17631. ISSN 2000-5121.
Office Action dated Sep. 5, 2018 pertaining to Japanese Patent Application No. 2014-117702.
Office Action dated Jun. 4, 2019 pertaining to Japanese Patent Application No. 2014-117702.
Office Action dated Sep. 30, 2018 pertaining to Chinese Patent Application No. 201410693385.4.

(56) References Cited

OTHER PUBLICATIONS

Office Action dated Apr. 22, 2019 pertaining to Chinese Patent Application No. 201410693385.4.
Office Action dated Sep. 21, 2018 pertaining to German Patent Application No. 10 2014 119 261.3.
Office Action dated Feb. 5, 2019 pertaining to Japanese Patent Application No. 2016-559529.
Office Action dated Jul. 12, 2018 pertaining to Chinese Patent Application No. 201580026216.8.
Office Action dated Apr. 1, 2019 pertaining to Chinese Patent Application No. 201580026216.8.
Office Action dated Oct. 9, 2019 pertaining to Chinese Patent Application No. 201580026216.8.
International Preliminary Report on Patentability dated Oct. 4, 2016 pertaining to PCT/US2015/018640, filed Mar. 4, 2015.
International Search Report and Written Opinion dated May 29, 2015 pertaining to PCT/US2015/018640, filed Mar. 4, 2015.
Office Action dated Nov. 2, 2018 pertaining to Chinese Patent Application No. 201510498432.4.
Office Action dated Jun. 28, 2019 pertaining to Chinese Patent Application No. 201510498432.4.
Office Action dated Dec. 3, 2019 pertaining to Chinese Patent Application No. 201510498432.4.
Office Action dated May 28, 2019 pertaining to Japanese Patent Application No. 2015-160731.
Office Action dated Mar. 20, 2018 pertaining to Japanese Patent Application No. 2015-169044.
Office Action dated Feb. 8, 2018 pertaining to German Patent Application No. 102015113535.3.
Office Action dated Sep. 4, 2018 pertaining to Chinese Patent Application No. 201510624641.9.
Office Action dated Nov. 5, 2019 pertaining to Japanese Patent Application No. 2016-014076.
Office Action dated Jul. 16, 2019 pertaining to Chinese Patent Application No. 201610040211.7.
Office Action dated Oct. 29, 2018 pertaining to Chinese Patent Application No. 201610397388.2.
Office Action dated Jun. 4, 2019 pertaining to Chinese Patent Application No. 201610397388.2.
Office Action dated May 29, 2018 pertaining to Japanese Patent Application No. 2016-113282.
Office Action dated Apr. 16, 2019 pertaining to Japanese Patent Application No. 2016-113282.
Office Action dated Oct. 29, 2018 pertaining to Chinese Patent Application No. 201610397718.8.
Office Action dated Jun. 5, 2018 pertaining to Japanese Patent Application No. 2016-113434.
Office Action dated Oct. 25, 2018 pertaining to Chinese Patent Application No. 201610395759.3.
Office Action dated Jun. 4, 2019 pertaining to Chinese Patent Application No. 201610395759.3.
Office Action dated May 29, 2018 pertaining to Japanese Patent Application No. 2016-113285.
Office Action dated Apr. 16, 2019 pertaining to Japanese Patent Application No. 2016-113285.
Office Action dated Jul. 10, 2019 pertaining to Chinese Patent Application No. 201710284783.4.
Office Action dated Sep. 18, 2018 pertaining to Japanese Patent Application No. 2017-085886.
Office Action dated Jun. 4, 2019 pertaining to Japanese Patent Application No. 2017-085886.
Office Action dated Jan. 23, 2013 pertaining to Japanese Patent Application No. 2008-208255.
Office Action dated Feb. 26, 2014 pertaining to Japanese Patent Application No. 2008-208255.
Office Action dated Sep. 30, 2014 pertaining to Japanese Patent Application No. 2008-208255.
Office Action dated Jan. 30, 2017 pertaining to Japanese Patent Application No. 2010-114777.
Office Action dated Jan. 29, 2015 pertaining to Japanese Patent Application No. 2011-126545.
Office Action dated Jun. 23, 2015 pertaining to Japanese Patent Application No. 2011-126545.
Office Action dated Jan. 27, 2014 pertaining to Japanese Patent Application No. 2011-213056.
Office Action dated Nov. 20, 2014 pertaining to Japanese Patent Application No. 2011-213056.
Office Action dated Aug. 15, 2017 pertaining to Japanese Patent Application No. 2013-167895.
Office Action dated Feb. 20, 2018 pertaining to Japanese Patent Application No. 2013-167895.
English Translation of German office action for application 10 2016 110 192.3 mail date Jan. 11, 2021 (12 pages).
English Translation of German office action for application 10 2016 110 314.4 mail date Jan. 11, 2021 (13 pages).
English Translation of German office action for application 10 2016 110 095.1 mail date Jan. 11, 2021 (13 pages).
German office action for application 11 2010 001 362.4 mail date May 10, 2021 (12 pages with English translation).
Chinese office action for application 202010927458.7 mail date Apr. 16, 2021 (27 pages with English translation).
German office action for application 10 2017 107 230.6 mail date Feb. 2, 2021 (14 pages with English translation).
Japanese office action for application 2020-002230 mail date Feb. 8, 2021 (5 pages with English translation).
International Search Report for Application No. PCT/US2023/032078 dated Dec. 22, 2023 (13 pages).

* cited by examiner

STRUCTURAL COLOR MULTILAYER STRUCTURES HAVING BARRIER LAYERS

CROSS-REFERENCE TO RELATED APPLICATION

This application claims the benefit of priority under 35 U.S.C. § 119 of U.S. Provisional Application Ser. No. 63/404,413 filed on Sep. 7, 2022, the content of which is relied upon and incorporated herein by reference in its entirety.

FIELD

The present application is related to multilayer structures, and in particular to multilayer structures comprising multilayer structures containing metal and metal oxide over a substrate for optical applications. At least one of the metal and metal oxide are deposited by atomic layer deposition (ALD), and a barrier layer is positioned between each adjacent metal and/or metal oxide layer.

BACKGROUND

Pigments made from multilayer structures are known. In addition, pigments that exhibit or provide a high-chroma structural color are also known. However, forming multilayer structures out of certain materials can be difficult because the deposition techniques for depositing various materials can have a negative impact on previously deposited materials. In addition, certain deposition techniques can be costly and time consuming making it very difficult to achieve commercially viable multilayer structures.

It is appreciated that the color produced by multilayer structure is dependent on the materials used as the various layers, the location of materials within the multilayer structure, and the properties of the individual layers (e.g., thickness). Accordingly, small variations in multilayer structure design can have a distinct impact on the color produced by the multilayer structure. However, conventional deposition techniques are not always effective for depositing the desired layers within a multilayer structure to achieve the best combinations for multilayer structures.

SUMMARY

According to embodiments, a multilayer structure that reflects color comprises: a core layer; a conformal dielectric layer encapsulating the core layer; a conformal barrier layer encapsulating the conformal dielectric layer; and a conformal absorber layer encapsulating the conformal barrier layer.

According to embodiments, the multilayer structure further comprises: a second conformal barrier layer encapsulating the conformal absorber layer; and a second conformal dielectric layer encapsulating the second conformal barrier layer.

According to embodiments, a method for making the multilayer structure comprises: depositing the conformal dielectric layer onto the core layer by CVD or ALD; depositing the conformal barrier layer onto the conformal dielectric layer by ALD; and depositing the conformal absorber layer onto the conformal dielectric layer by ALD.

Additional features and advantages will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Preparing multilayer structures can be a complex, expensive process because, in part, very tight control over layer thicknesses is required. The deposition methods used to deposit layers can vary in complexity and cost depending on the material that makes up a given layer and the desired thickness of the layer.

In addition, it can be challenging to deposit layers directly on a core layer, such as an aluminum (Al) reflective core layer, by less expensive wet chemical methods as these methods require highly acidic or basic conditions. In addition, there are challenges to depositing precisely-controlled ultrathin absorber layers other than by vacuum coating methods. For instance, ALD can precisely deposit thin layers, but ALD is costly and time-consuming. In particular, the ALD methods conventionally used are low-volume and are cost prohibitive to manufacture at a commercial scale. Moreover, when attempts were made to increase the production volume, it was noticed that various metal and/or metal oxide layers overlapped one another and formed a mixed layer that could have an effect on the optical properties of the multilayer structure.

Embodiments of the multilayer structure described herein may be used to omnidirectionally reflect wavelengths of visible light over a range of angles of incidence or viewing (such as hues between 0° and 120°). It will be understood that the terms "electromagnetic wave," "electromagnetic radiation," and "light," as used herein, may interchangeably refer to various wavelengths of light incidence on a multilayer structure and that such light may have wavelengths in the ultraviolet (UV), infrared (IR), and visible portions of the electromagnetic spectrum.

As used herein, a "core layer" refers to a reflective core layer and a non-reflective core layer, and the "core layer" may have any shape including, but not limited to a flake, a sphere, an ovoid, and the like. As used herein, an "absorber layer" includes a metallic absorber layer and a non-metallic absorber layer.

Figure 1:
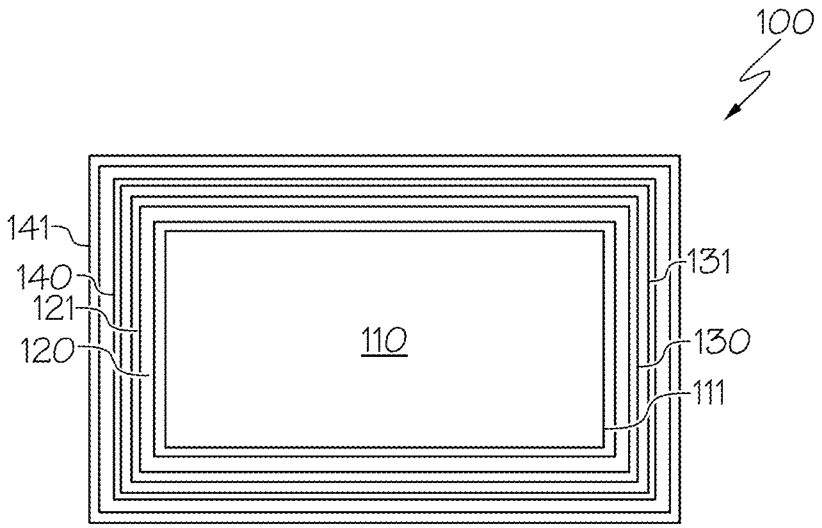
FIG. 1 schematically depicts a multilayer structure according to embodiments disclosed and described herein.

Referring now to FIG. 1, a multilayer structure 100 according to embodiments disclosed and described herein comprises a core layer 110, a first conformal protective layer 111 that encapsulates the core layer 110, a conformal dielectric layer 120 that encapsulates the first conformal protective layer 111, a conformal barrier layer 121 that encapsulates the conformal dielectric layer 120, a conformal absorber layer 130 that encapsulates the conformal barrier layer 121, a second conformal barrier layer 131 that encapsulates the conformal absorber layer 130, a second conformal dielectric layer 140 that encapsulates the second conformal barrier layer 131, and a conformal outer layer 141 that encapsulates the second conformal dielectric layer 140.

In one or more embodiments, the multilayer structure 100 may comprise less layers than those depicted in FIG. 1. For instance, in embodiments, a multilayer structure 100 comprises a core layer 110, a first conformal protective layer 111 that encapsulates the core layer 110, a conformal dielectric layer 120 that encapsulates the first conformal protective layer 111, a conformal barrier layer 121 that encapsulates the conformal dielectric layer 120, a conformal absorber layer 130 that encapsulates the conformal barrier layer 121, a second conformal barrier layer 131 that encapsulates the conformal absorber layer 130, and a second conformal dielectric layer 140 that encapsulates the second conformal barrier layer 131.

In one or more embodiments, a multilayer structure 100 comprises a core layer 110, a conformal dielectric layer 120 that encapsulates the core layer 110, a conformal barrier layer 121 that encapsulates the conformal dielectric layer 120, a conformal absorber layer 130 that encapsulates the conformal barrier layer 121, a second conformal barrier layer 131 that encapsulates the conformal absorber layer 130, and a second conformal dielectric layer 140 that encapsulates the second conformal barrier layer 131. An optional conformal outer layer 141 may encapsulate the second conformal dielectric layer 140.

In embodiments, a multilayer structure 100 comprises a core layer 110, a conformal dielectric layer 120 that encapsulates the core layer 110, a conformal barrier layer 121 that encapsulates the conformal dielectric layer 120, and a conformal absorber layer 130 that encapsulates the conformal barrier layer 121. A protective layer may optionally encapsulate the conformal absorber layer.

In one or more embodiments, a multilayer structure 100 comprises a core layer 110, a first conformal protective layer 111 that encapsulates the core layer 110, a conformal dielectric layer 120 that encapsulates the first conformal protective layer 111, a conformal barrier layer 121 that encapsulates the conformal dielectric layer 120, and a conformal absorber layer 130 that encapsulates the conformal barrier layer 121. A second conformal barrier layer 131 may optionally encapsulate the conformal absorber layer 130.

Figure 2A:
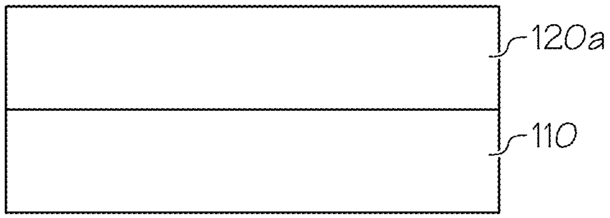
FIG. 2A depicts a multilayer structure with a dielectric layer extending over a reflective core layer used in the design of a multilayer structure.
Figure 2B:
FIG. 2B depicts a multilayer structure with an absorber layer extending over a reflective core layer used in the design of a multilayer structure.
Figure 2C:
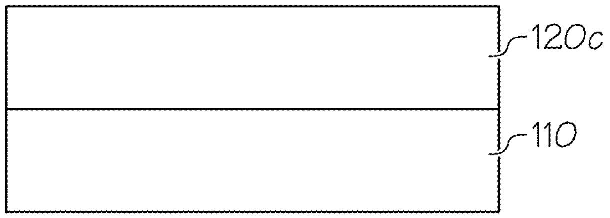
FIG. 2C depicts a multilayer structure with a dielectric layer extending over a reflective core layer used in the design of multilayer structures according to one or more embodiments shown and described herein.
Figure 3:
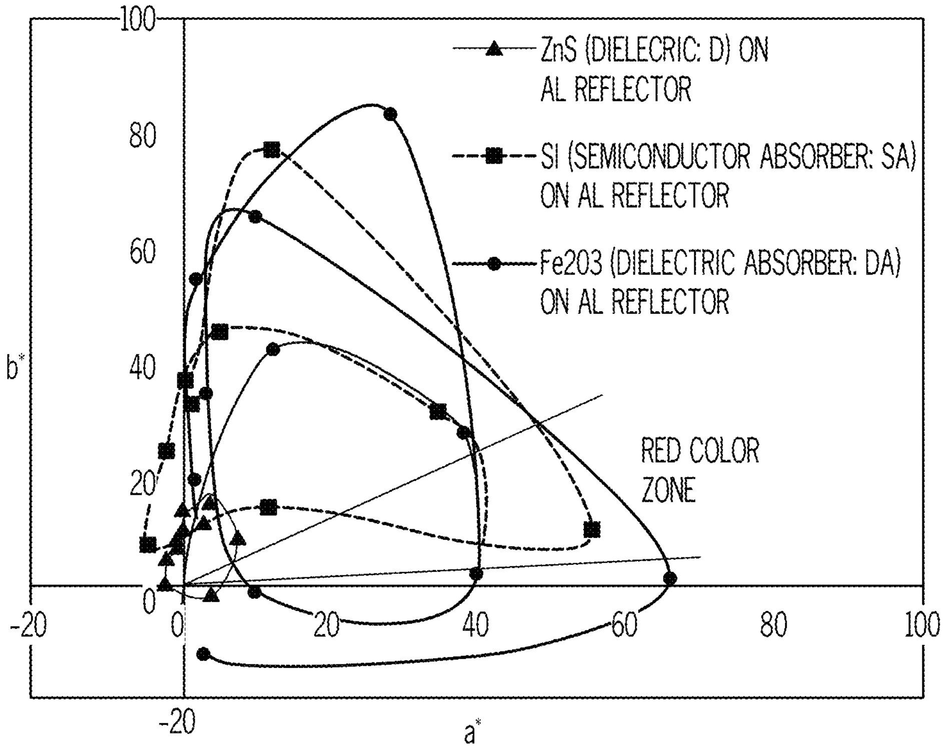
FIG. 3 depicts reflectance properties of the multilayer structures illustrated in FIGS. 2A-2C on a Lab color space.

Referring to FIGS. 2A-2C and 3, the effectiveness of different types of layers extending across a reflective core layer 110 in attaining a desired hue level in a red region of the visible light spectrum as plotted or shown on a Lab color space is depicted. FIG. 2A depicts a ZnS dielectric layer 120*a* extending across a reflective core layer 110, FIG. 2B depicts a Si semiconductor absorber layer 120*b* extending across a reflective core layer 110, and FIG. 2C depicts an $Fe_2O_3$ absorber layer 120*c* extending across a reflective core layer 110. Simulations of the reflectance from each multilayer structure illustrated in FIGS. 2A-2C are performed as a function of different thicknesses for the dielectric layer 120*a*, the semiconductor absorber layer 120*b*, and absorber layer 120*c*. The results of the simulations are plotted on a Lab color space, also known as an a*b* color map, shown in FIG. 3. Each data point shown in FIG. 3 provides a chroma and a hue for particular thickness of the dielectric layer for the multilayer structure depicted in FIG. 2A, the semiconductor absorber layer for the multilayer structure depicted in FIG. 2B or the absorber layer for the multilayer structure depicted in FIG. 2C. Chroma can be defined as $C=\sqrt{(a^{*2}+b^{*2})}$ and hue can be defined as $\tan^{-1}(a^*/b^*)$. The hue can also be referred to as the angle relative to the positive a*-axis of a given data point. A hue value provides a measure of the color displayed by an object (e.g., red, green, blue, yellow etc.), and a chroma value provides a measure of the color's "brightness." As shown in FIG. 3, the multilayer structure illustrated in FIG. 2A provides low chroma compared to the multilayer structures illustrated in FIGS. 2B and 2C. Accordingly, FIGS. 2A-2C and FIG. 3 demonstrate that an absorber layer, (e.g., an absorber layer) is preferred over a dielectric layer as a first layer extending over a reflective core layer when colors with high chroma are desired. It should be understood that the Lab color space analysis shown in FIG. 3 is for illustrative purposes and that multilayer structures according to embodiments disclosed and described herein may have different Lab color space values. For instance, in embodiments, the multilayer structures could exhibit a blue, green, yellow, or other colors in the Lab color space.

Figure 4A:
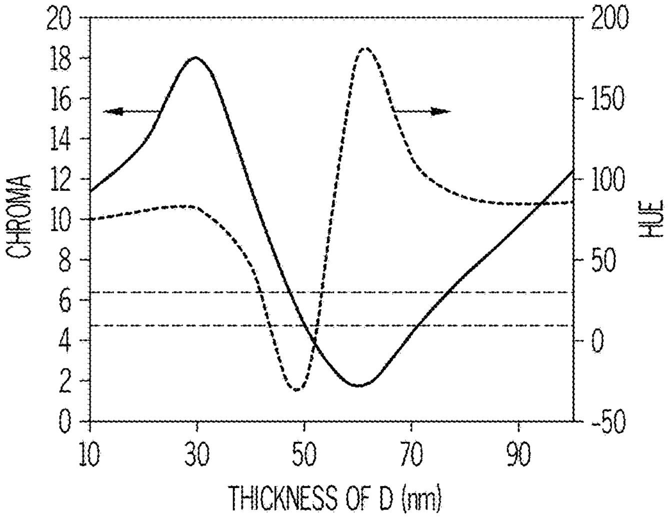
FIG. 4A graphically depicts chroma and hue values as a function of dielectric layer thickness for the multilayer structure illustrated in FIG. 2A.
Figure 4B:
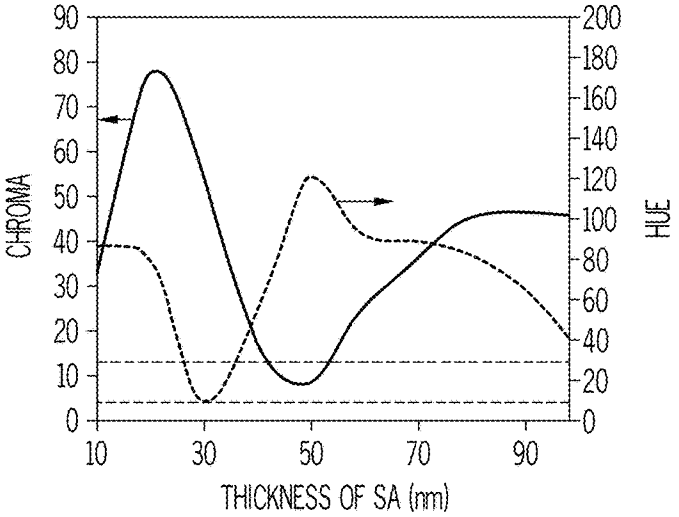
FIG. 4B graphically depicts chroma and hue values as a function of semiconductor absorber layer thickness for the multilayer structure illustrated in FIG. 2B.
Figure 4C:
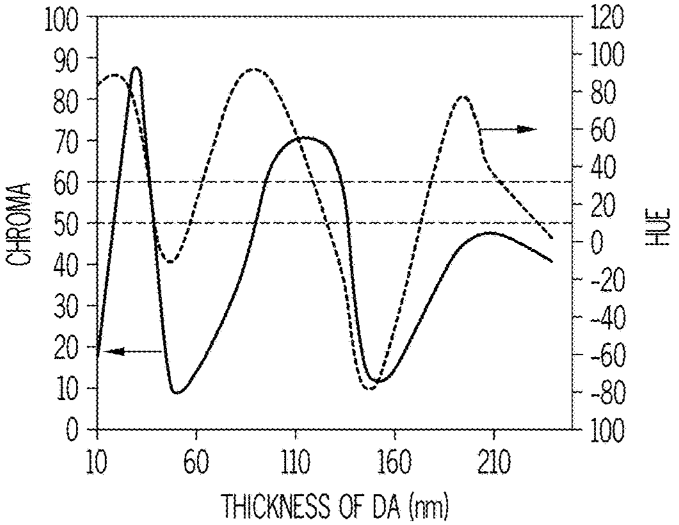
FIG. 4C graphically depicts chroma and hue values as a function of dielectric layer thickness for the multilayer structure illustrated in FIG. 2C.

Referring to FIGS. 4A-4C, chroma and hue as a function of layer thickness is depicted. Specifically, FIG. 4A graphically depicts the chroma and hue as a function of the thickness of the ZnS dielectric layer extending over the Al reflective core layer illustrated in FIG. 2A. FIG. 4B depicts the chroma and hue as a function of the thickness of the Si semiconductor absorber layer extending over the Al reflective core layer illustrated in FIG. 2B. FIG. 4C depicts the chroma and hue as a function of the thickness of the $Fe_2O_3$ absorber layer extending over the Al reflective core layer illustrated in FIG. 2C. The dotted lines in FIGS. 4A-4C correspond to desired hue values between 10° and 30° on the Lab color space. FIGS. 4A-4C illustrate that higher chroma values within the hue range between 10° and 30° are achieved for multilayer structures having a absorber layer extending across the reflective core layer. Again, it should be understood that the hue and chroma shown in FIG. 4A-4C is for illustrative purposes and that multilayer structures according to embodiments disclosed and described herein may have different hue and chroma values.

Referring again to FIG. 1, a multilayer structure 100 includes a core layer 110, a first conformal protective layer 111 encapsulating the core layer 110, a conformal dielectric layer 120 encapsulating the first conformal protective layer 111, a first conformal barrier layer 121 encapsulating the conformal dielectric layer 120, a conformal absorber layer 130 encapsulating the first conformal barrier layer 121, a second conformal barrier layer 131 encapsulating the conformal absorber layer 130, a second conformal dielectric layer 140 encapsulating the second conformal barrier layer 131, and an optional conformal outer layer 141 encapsulating the second conformal dielectric layer 140. In embodiments, the "outer layer" has an outer free surface (i.e., an outer surface not in contact with an absorber layer or another dielectric layer that is not part of a protective coating). As shown in FIG. 1, embodiments of multilayer structures disclosed and described herein comprise a conformal dielectric layer 120 and a conformal absorber layer 130. As used herein, "conformal" is used to indicate that the layer conforms to the size and shape of the layer to which it is deposited and encapsulates (i.e., is present on all sides) of the layer to which it is deposited and conforms to the contours of the layer which it is deposited. Although FIG. 1 shows a rectangular structure, this is for illustrative purposes only, and often the multilayer structure will have an asymmetric and non-uniform shape. In embodiments, the multilayer structure may be spherical or ovoid. It should be understood that embodiments may also include a multilayer structure with a conformal absorber encapsulating the core layer, and a conformal dielectric layer encapsulating the conformal absorber layer.

In embodiments, the core layer 110 can have a thickness that is greater than or equal to 20 nm and less than or equal to 100 μm, such as greater than or equal to 50 nm and less than or equal to 80 μm, greater than or equal to 75 nm and less than or equal to 60 μm, greater than or equal to 100 nm and less than or equal to 40 μm, greater than or equal to 125 nm and less than or equal to 20 μm, or greater than or equal to 150 nm and less than or equal to 1 μm. The core layer 110 can, in one or more embodiments, have a thickness between 50 nm and 10 μm, such as between 100 nm and 10 μm, between 250 nm and 10 μm, between 500 nm and 10 μm, between 750 nm and 10 μm, between 1 μm and 10 μm, between 2 μm and 10 μm, between 5 μm and 10 μm, between 8 μm and 10 μm, between 50 nm and 8 μm, between 100 nm and 8 μm, between 250 nm and 8 μm, between 500 nm and 8 μm, between 750 nm and 8 μm, between 1 μm and 8 μm, between 2 μm and 8 μm, between 5 μm and 8 μm, between 50 nm and 5 μm, between 100 nm and 5 μm, between 250 nm and 5 μm, between 500 nm and 5 μm, between 750 nm and 5 μm, between 1 μm and 5 μm, between 2 μm and 5 μm, between 50 nm and 2 μm, between 100 nm and 2 μm, between 250 nm and 2 μm, between 500 nm and 2 μm, between 750 nm and 2 μm, between 1 μm and 2 μm, between 50 nm and 1 μm, between 100 nm and 1 μm, between 250 nm and 1 μm, between 500 nm and 1 μm, between 750 nm and 1 μm, between 50 nm and 750 nm, between 100 nm and 750 nm, between 250 nm and 750 nm, between 500 nm and 750 nm, between 50 nm and 500 nm, between 100 nm and 500 nm, between 250 nm and 500 nm, between 50 nm and 250 nm, between 100 nm and 250 nm, or between 50 nm and 100 nm.

In embodiments, the core layer 110 can be made from at least one of a "gray metallic" material, such as Al, Ag, Pt, Sn; at least one of a "colorful metallic" material, such as Au, Cu, brass, bronze, TiN, Cr, stainless steel, or a combination thereof. In one or more embodiments, the core layer 110 can be made from an oxide, such as alumina ($Al_2O_3$), silica ($SiO_2$), bismuth oxychloride, or glass materials. The core layer 110 can have plate-like shape or can be spherical or ovoid, as mentioned above.

In one or more embodiments, the first conformal protective layer 111 has a thickness that is less than or equal to 50 nm and greater than or equal to 5 nm, such as less than or equal to 40 nm and greater than or equal to 5 nm, less than or equal to 30 nm and greater than or equal to 5 nm, less than or equal to 20 nm and greater than or equal to 5 nm, less than or equal to 10 nm and greater than or equal to 5 nm, less than or equal to 50 nm and greater than or equal to 10 nm, less than or equal to 40 nm and greater than or equal to 10 nm, less than or equal to 30 nm and greater than or equal to 10 nm, less than or equal to 20 nm and greater than or equal to 10 nm, less than or equal to 50 nm and greater than or equal to 20 nm, less than or equal to 40 nm and greater than or equal to 20 nm, less than or equal to 30 nm and greater than or equal to 20 nm, less than or equal to 50 nm and greater than or equal to 30 nm, less than or equal to 40 nm and greater than or equal to 30 nm, or less than or equal to 50 nm and greater than or equal to 40 nm.

The first conformal protective layer 111 may, in embodiments, be formed from a chromate coating, a phosphate coating, an oxide coating (such as $SiO_2$), and may be applied to the core layer 110 by chemical vapor deposition (CVD), physical vapor deposition (PVD), wet chemical methods, or ALD.

According to one or more embodiments, the conformal dielectric layer 120 has a thickness that is greater than or equal to 5 nm and less than or equal to 500 nm, such as greater than or equal to 10 nm and less than or equal to 475 nm, greater than or equal to 10 nm and less than or equal to 450 nm, greater than or equal to 10 nm and less than or equal to 425 nm, greater than or equal to 10 nm and less than or equal to 400 nm, greater than or equal to 10 nm and less than or equal to 375 nm, greater than or equal to 10 nm and less than or equal to 350 nm, greater than or equal to 10 nm and less than or equal to 325 nm, or greater than or equal to 10 nm and less than or equal to 300 nm. The conformal dielectric layer 120 can, according to embodiments, have a thickness between 5 nm and 300 nm, such as between 10 nm and 300 nm, between 15 nm and 300 nm, between 25 nm and 300 nm, between 50 nm and 300 nm, between 75 nm and 300 nm, between 100 nm and 300 nm, between 125 nm and 300 nm, between 150 nm and 300 nm, between 175 nm and 300 nm, between 200 nm and 300 nm, between 225 nm and 300 nm, between 250 nm and 300 nm, between 275 nm and 300 nm, between 5 nm and 275 nm, between 10 nm and 275 nm, between 15 nm and 275 nm, between 25 nm and 275 nm, between 50 nm and 275 nm, between 75 nm and 275 nm, between 100 nm and 275 nm, between 125 nm and 275 nm, between 150 nm and 275 nm, between 175 nm and 275 nm, between 200 nm and 275 nm, between 225 nm and 275 nm, between 250 nm and 275 nm, between 5 nm and 250 nm, between 10 nm and 250 nm, between 15 nm and 250 nm, between 25 nm and 250 nm, between 50 nm and 250 nm, between 75 nm and 250 nm, between 100 nm and 250 nm, between 125 nm and 250 nm, between 150 nm and 250 nm, between 175 nm and 250 nm, between 200 nm and 250 nm, between 225 nm and 250 nm, between 5 nm and 225 nm, between 10 nm and 225 nm, between 15 nm and 225 nm, between 25 nm and 225 nm, between 50 nm and 225 nm, between 75 nm and 225 nm, between 100 nm and 225 nm, between 125 nm and 225 nm, between 150 nm and 225 nm, between 175 nm and 225 nm, between 200 nm and 225 nm, between 5 nm and 200 nm, between 10 nm and 200 nm, between 15 nm and 200 nm, between 25 nm and 200 nm, between 50 nm and 200 nm, between 75 nm and 200 nm, between 100 nm and 200 nm, between 125 nm and 200 nm, between 150 nm and 200 nm, between 175 nm and 200 nm, between 5 nm and 175 nm, between 10 nm and 175 nm, between 15 nm and 175 nm, between 25 nm and 175 nm, between 50 nm and 175 nm, between 75 nm and 175 nm, between 100 nm and 175 nm, between 125 nm and 175 nm, between 150 nm and 175 nm, between 5 nm and 150 nm, between 10 nm and 150 nm, between 15 nm and 150 nm, between 25 nm and 150 nm, between 50 nm and 150 nm, between 75 nm and 150 nm, between 100 nm and 150 nm, between 125 nm and 150 nm, between 5 nm and 100 nm, between 10 nm and 100 nm, between 15 nm and 100 nm, between 25 nm and 100 nm, between 50 nm and 100 nm, between 75 nm and 100 nm, between 5 nm and 75 nm, between 10 nm and 75 nm, between 15 nm and 75 nm, between 25 nm and 75 nm, between 50 nm and 75 nm, between 5 nm and 50 nm, between 10 nm and 50 nm, between 15 nm and 50 nm, between 25 nm and 50 nm, between 5 nm and 25 nm, between 10 nm and 25 nm, between 15 nm and 25 nm, between 5 nm and 15 nm, between 10 nm and 15 nm, or between 5 nm and 10 nm.

The first conformal dielectric layer 120 is, in embodiments, a high refractive index material, such as $TiO_2$ (including anatase, rutile, or amorphous $TiO_2$ and mixtures thereof), ZnS, $ZrO_2$, $HfO_2$, $Fe_3O_4$, or AlAs. In one or more embodiments, the conformal dielectric layer 120 may be made from high refractive index absorptive dielectric materials such as $Fe_2O_3$, PbS, GaAs, or InAs. In embodiments, the conformal dielectric layer may be made from a low refractive index material, such as $SiO_2$, $MgF_2$, KBr, ZnO, or $Al_2O_3$. The conformal dielectric layer 120 can, in embodiments, be deposited to encapsulate the core layer 110 by CVD, PVD, wet chemical methods, or ALD.

In embodiments, the first conformal barrier layer 121 has a thickness that is less than or equal to 50 nm, such as less than or equal to 45 nm, less than or equal to 40 nm, less than or equal to 35 nm, less than or equal to 30 nm, less than or equal to 25 nm, less than or equal to 20 nm, as less than or equal to 15 nm, less than or equal to 10 nm, less than or equal to 5 nm, or less than or equal to 2 nm. The barrier layer, according to embodiments, has a thickness that is greater than or equal to 1 nm and less than or equal to 50 nm, such as greater than or equal to 1 nm and less than or equal to 45 nm, greater than or equal to 1 nm and less than or equal to 40 nm, greater than or equal to 1 nm and less than or equal to 35 nm, greater than or equal to 1 nm and less than or equal to 30 nm, or greater than or equal to 1 nm and less than or equal to 25 nm. In one or more embodiments, the barrier layer has a thickness that is greater than or equal to 1 nm and less than or equal to 20 nm, such as greater than or equal to 1 nm and less than or equal to 15 nm, greater than or equal to 1 nm and less than or equal to 10 nm, greater than or equal to 1 nm and less than or equal to 5 nm, greater than or equal to 1 nm and less than or equal to 2 nm, greater than or equal to 2 nm and less than or equal to 20 nm, greater than or equal to 2 nm and less than or equal to 15 nm, greater than or equal to 2 nm and less than or equal to 10 nm, greater than or equal to 2 nm and less than or equal to 5 nm, greater than or equal to 5 nm and less than or equal to 20 nm, greater than or equal to 5 nm and less than or equal to 15 nm, greater than or equal to 5 nm and less than or equal to 10 nm, greater than or equal to 10 nm and less than or equal to 20 nm, greater than or equal to 10 nm and less than or equal to 20 nm, greater than or equal to 15 nm and less than or equal to 20 nm, or greater than or equal to 15 nm and less than or equal to 20 nm.

The first conformal barrier layer 121 may, in embodiments, be formed from $Al_2O_3$, $SiO_2$, $MgF_2$, KBr, or ZnO, and may be applied to the first conformal dielectric layer 120 by ALD.

A conformal absorber layer 130 encapsulates the first conformal barrier layer 121. The location of the conformal absorber layer 130 is chosen to increase the absorption of target light wavelengths. For instance, if the multilayer structure is to be configured to absorb electromagnetic radiation having wavelengths that are less than or equal to 550 nm but reflect electromagnetic radiation with wavelengths of approximately 650 nm, such as visible light outside of the hue between 10° and 30°, the absorber layer is placed at a thickness where the electric field ($|E|^2$) is less at the 550 nm wavelength than at the 650 nm wavelength. Mathematically, this can be expressed as:

$$E_{550}|^2 << |E_{650}|^2 \quad (1)$$

and preferably:

$$|E_{650}|^2 \approx 0 \quad (2)$$

Figure 5:
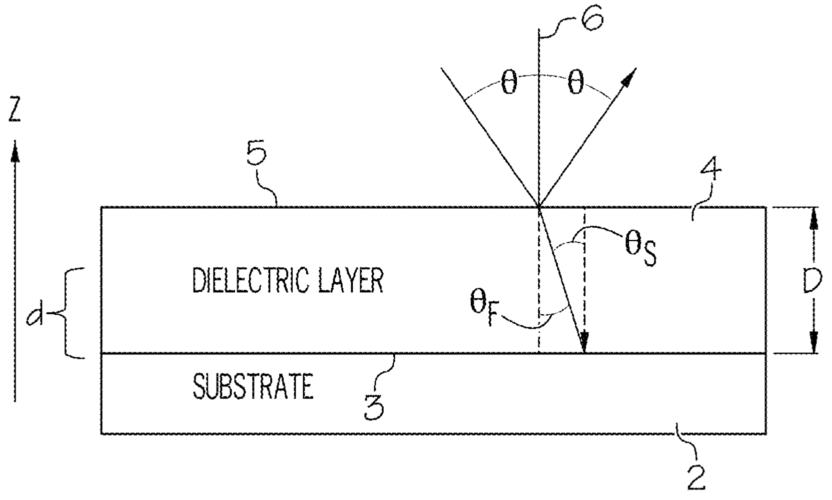
FIG. 5 depicts a multilayer structure with a dielectric layer extending over a substrate layer and exposed to electromagnetic radiation at an angle θ relative to a normal direction to the outer surface of the dielectric layer.

FIG. 5 and the following discussion provide a method for calculating the thickness of a zero or near-zero electric field point at a given wavelength of light, according to embodiments. For the purposes of the present specification, the term "near-zero" is defined $|E|^2 \leq 10$. FIG. 5 illustrates a multilayer structure with a dielectric layer 4 having a total thickness "D", an incremental thickness "d" and an index of refraction "n" on a substrate layer 2 having an index of refraction "$n_s$". The substrate layer 2 can be a core layer or a reflective core layer of a multilayer structure. Incident light strikes the outer surface 5 of the dielectric layer 4 at angle θ relative to line 6, which is perpendicular to the outer surface 5, and reflects from the outer surface 5 at the same angle θ. Incident light is transmitted through the outer surface 5 and into the dielectric layer 4 at an angle $\theta_F$ relative to the line 6 and strikes the surface 3 of substrate layer 2 at an angle $\theta_s$. For a single dielectric layer, $\theta_s=\theta_F$ and the energy/electric field (E) can be expressed as E(z) when z=d. From Maxwell's equations, the electric field can be expressed for s polarization as:

$$\vec{E}(d)=\{u(z),0,0\}\exp(ik\alpha y)|_{z=d} \tag{3}$$

and for p polarization as:

$$\vec{E}(d)=\left\{0,\ u(z),\ -\frac{\alpha}{\tilde{\varepsilon}(z)}v(z)\right\}\exp(ik\alpha y)|_{z=d} \tag{4}$$

where $$k=\frac{2\pi}{\lambda},\ \lambda$$

is a desired wavelength to be reflected, $\alpha=n_s \sin\theta_s$, where "s" corresponds to the substrate in FIG. 7, and $\tilde{\varepsilon}(z)$ is the permittivity of the layer as a function of z. As such:

$$|E(d)|^2=|u(z)|^2\exp(2ik\alpha y)|_{z=d} \tag{5}$$

for s polarization, and $$|E(d)^2|=\left[|u(z)|^2+\left|\frac{\alpha}{\sqrt{n}}v(z)\right|^2\right]\exp(2ik\alpha y)|_{z=d} \tag{6}$$

for p polarization.

It should be appreciated that variation of the electric field along the Z direction of the dielectric layer 4 can be estimated by calculation of the unknown parameters u(z) and v(z), where it can be shown that:

$$\begin{pmatrix}u\\v\end{pmatrix}_{z=d}=\begin{pmatrix}\cos\varphi & (i/q)\sin\varphi\\ iq\sin\varphi & \cos\varphi\end{pmatrix}\begin{pmatrix}u\\v\end{pmatrix}_{z=0,substrate} \tag{7}$$

where 'i' is the square root of −1. Using the boundary conditions $u|_{z=0}=1$, $v|_{z=0}=q_s$, and the following relations:

$$q_s=n_s\cos\theta_s \text{ for } s\text{-polarization} \tag{8}$$

$$q_s=n_s/\cos\theta_s \text{ for } p\text{-polarization} \tag{9}$$

$$q=n\cos\theta_F \text{ for } s\text{-polarization} \tag{10}$$

$$q=n/\cos\theta_F \text{ for } p\text{-polarization} \tag{11}$$

$$\varphi=k\cdot n\cdot d\cos(\theta_F) \tag{12}$$

u(z) and v(z) can be expressed as:

$$\begin{aligned}u(z)|_{z=d}&=u|_{z=0}\cos\varphi+v|_{z=o}\left(\frac{1}{q}\sin\varphi\right)\\&=\cos\varphi+\frac{i.q_s}{q}\sin\varphi\end{aligned} \tag{13}$$

-continued and $$\begin{aligned}v(z)|_{z=d}&=iqu|_{z=0}\sin\varphi+v|_{z=0}\cos\varphi\\&=iq\sin\varphi+q_s\cos\varphi\end{aligned} \tag{14}$$

Therefore:

$$\begin{aligned}|E(d)^2|&=\left[\cos^2\varphi+\frac{q_s^2}{q^2}\sin^2\varphi\right]e^{2ik\alpha\gamma}\\&=\left[\cos^2\varphi+\frac{n_s^2}{n^2}\sin^2\varphi\right]e^{2ik\alpha\gamma}\end{aligned} \tag{15}$$

for s polarization with $\varphi=k\cdot n\cdot d\cos(\theta_F)$, and:

$$\begin{aligned}|E(d)^2|&=\left[\cos^2\varphi+\frac{n_s^2}{n^2}\sin^2\varphi+\frac{\alpha^2}{n}\left(q_s^2\cos^2\varphi+q^2\sin^2\varphi\right)\right]\\&=\left[\left(1+\frac{\alpha^2q_s^2}{n}\right)\cos^2\varphi+\left(\frac{n_s^2}{n^2}+\frac{\alpha^2q^2}{n}\right)\sin^2\varphi\right]\end{aligned} \tag{16}$$

for p polarization where:

$$\alpha=n_s\sin\theta_s=n\sin\theta_F \tag{17}$$

$$q_s=\frac{n_s}{\cos\theta_s} \tag{18}$$

and $$q_s=\frac{n}{\cos\theta_F} \tag{19}$$

Thus for a simple situation where $\theta_F=0$ or normal incidence, $\varphi=k\cdot n\cdot d$, and $\alpha=0$:

$$|E(d)^2| \text{ for } s\text{-polarization} = \tag{20}$$

$$|E(d)^2| \text{ for } p\text{-polarization} = \left[\cos^2\varphi+\frac{n_s^2}{n^2}\sin^2\varphi\right]$$

$$=\left[\cos^2(k\cdot n\cdot d)+\frac{n_s^2}{n^2}\sin^2(k\cdot n\cdot d)\right] \tag{21}$$

which allows for the thickness "d" to be solved for (i.e., the position or location within the dielectric layer where the electric field is zero). It should be appreciated that the thickness "d" can be the thickness of the first conformal dielectric layer 120, the first conformal barrier layer 121, and the first conformal protective layer 111 that encapsulate the core layer 110 and that provides a zero or near zero electric field at the interface between the first conformal dielectric layer 120 and the conformal absorber layer 130. It should also be appreciated that the thickness "d" can also be the thickness of the second conformal dielectric layer 140 encapsulating the second conformal barrier layer 131 that provides a zero or near zero electric field at the interface between the dielectric outer layer and the conformal absorber layer 130, depending on the thickness "d" where the electric field is zero or near-zero.

In embodiments, the conformal absorber layer has a thickness that is from greater than or equal to 2 nm and less than or equal to 50 nm, such as greater than or equal to 2 nm and less than or equal to 45 nm, greater than or equal to 2 nm and less than or equal to 40 nm, greater than or equal to 2 nm and less than or equal to 35 nm, greater than or equal to 2 nm and less than or equal to 30 nm, or greater than or equal to 2 nm and less than or equal to 25 nm. The conformal absorber layer 130 can, in embodiments, have a thickness between 2 nm and 20 nm, such as between 5 nm and 20 nm, between 8 nm and 20 nm, between 10 nm and 20 nm, between 12 nm and 20 nm, between 15 nm and 20 nm, between 18 nm and 20 nm, between 2 nm and 18 nm, between 5 nm and 18 nm, between 8 nm and 18 nm, between 10 nm and 18 nm, between 12 nm and 18 nm, between 15 nm and 18 nm, between 2 nm and 15 nm, between 5 nm and 15 nm, between 8 nm and 15 nm, between 10 nm and 15 nm, between 12 nm and 15 nm, between 2 nm and 12 nm, between 5 nm and 12 nm, between 8 nm and 12 nm, between 10 nm and 12 nm, between 2 nm and 10 nm, between 5 nm and 10 nm, between 8 nm and 10 nm, between 2 nm and 8 nm, between 5 nm and 8 nm, or between 2 nm and 5 nm.

In embodiments, the conformal absorber layer 130 can be made from at least a material selected from W, Cr, Ge, Ni, stainless steel, Pd, Ti, Si, V, TiN, Co, Mo, Nb, ferric oxide, or combinations thereof. In one or more embodiments, the conformal absorber layer 130 is comprised of W. In embodiments, ALD is used to deposit the conformal absorber layer 130 because ALD allows uniform deposition of materials at the thicknesses desired. Other deposition methods have difficulty depositing uniform layers at thicknesses of 20 nm and below.

In embodiments, the second conformal barrier layer 121 has a thickness that is less than or equal to 50 nm, such as less than or equal to 45 nm, less than or equal to 40 nm, less than or equal to 35 nm, less than or equal to 30 nm, less than or equal to 25 nm, less than or equal to 20 nm, as less than or equal to 15 nm, less than or equal to 10 nm, less than or equal to 5 nm, or less than or equal to 2 nm. The second conformal barrier layer, according to embodiments, has a thickness that is greater than or equal to 1 nm and less than or equal to 50 nm, such as greater than or equal to 1 nm and less than or equal to 45 nm, greater than or equal to 1 nm and less than or equal to 40 nm, greater than or equal to 1 nm and less than or equal to 35 nm, greater than or equal to 1 nm and less than or equal to 30 nm, or greater than or equal to 1 nm and less than or equal to 25 nm. In one or more embodiments, the second conformal barrier layer has a thickness that is greater than or equal to 1 nm and less than or equal to 20 nm, such as greater than or equal to 1 nm and less than or equal to 15 nm, greater than or equal to 1 nm and less than or equal to 10 nm, greater than or equal to 1 nm and less than or equal to 5 nm, greater than or equal to 1 nm and less than or equal to 2 nm, greater than or equal to 2 nm and less than or equal to 20 nm, greater than or equal to 2 nm and less than or equal to 15 nm, greater than or equal to 2 nm and less than or equal to 10 nm, greater than or equal to 2 nm and less than or equal to 5 nm, greater than or equal to 5 nm and less than or equal to 20 nm, greater than or equal to 5 nm and less than or equal to 15 nm, greater than or equal to 5 nm and less than or equal to 10 nm, greater than or equal to 10 nm and less than or equal to 20 nm, greater than or equal to 10 nm and less than or equal to 20 nm, greater than or equal to 15 nm and less than or equal to 20 nm, or greater than or equal to 15 nm and less than or equal to 20 nm.

The second conformal barrier layer 131 may, in embodiments, be formed from $SiO_2$, $MgF_2$, KBr, ZnO, or $Al_2O_3$, and may be applied to the conformal absorber layer 130 by chemical vapor deposition (CVD), physical vapor deposition (PVD), wet chemical methods, or ALD.

The second conformal dielectric layer 140 can, in embodiments, have a thickness greater than 0.1 quarter wave (QW) to less than or equal to 4.0 QW where the control wavelength is determined by the target wavelength at the peak reflectance in the visible wavelength, such as between 0.5 QW and 4.0 QW, between 1.0 QW and 4.0 QW, between 1.5 QW and 4.0 QW, between 2.0 QW and 4.0 QW, between 2.5 QW and 4.0 QW, between 3.0 QW and 4.0 QW, or between 3.5 QW and 4.0 QW. In embodiments, the second conformal dielectric layer 140 can have a thickness from greater than 0.1 QW to less than 3.5 QW, such as from greater than 0.1 QW to less than 3.0 QW, from greater than 0.1 QW to less than 2.5 QW, from greater than 0.1 QW to less than 2.0 QW, from greater than 0.1 QW to less than 1.5 QW, from greater than 0.1 QW to less than 1.0 QW, or from greater than 0.1 QW to less than 0.5 QW. In some embodiments, the second conformal dielectric layer 140 can have a thickness from 0.5 QW to 3.5 QW, such as from 1.0 QW to 3.0 QW, or from 1.5 QW to 2.5 QW. In embodiments, the target wavelength may be about 1050 nm.

In embodiments, the second conformal dielectric layer 140 may be formed from $TiO_2$ (including anatase, rutile, or amorphous $TiO_2$ and mixtures thereof), ZnS, $ZrO_2$, $HfO_2$, $Fe_3O_4$, or AlAs. In one or more embodiments, the second conformal dielectric layer 140 may be made from high refractive index absorptive dielectric materials such as $Fe_2O_3$, PbS, GaAs, InAs. In embodiments, the second conformal dielectric layer 140 may be made from a low refractive index material, such as $SiO_2$, $MgF_2$, KBr, ZnO, or $Al_2O_3$. In embodiments, the second conformal dielectric layer 140 may be deposited by CVD or ALD.

In embodiments, the second conformal dielectric layer 140 can have a thickness between 5 and 500 nm, such as between 50 nm and 500 nm, between 100 nm and 500 nm, between 150 nm and 500 nm, between 200 nm and 500 nm, between 250 nm and 500 nm, between 300 nm and 500 nm, between 350 nm and 500 nm, between 400 nm and 500 nm, or between 450 nm and 500 nm. In some embodiments, the second conformal dielectric layer 140 can have a thickness between 5 nm and 450 nm, such as between 5 nm and 400 nm, between 5 nm and 350 nm, between 5 nm and 300 nm, between 5 nm and 250 nm, between 5 nm and 200 nm, between 5 nm and 150 nm, between 5 nm and 100 nm, or between 5 nm and 50 nm. In embodiments, the second conformal dielectric layer 140 can have a thickness between 50 nm to 450 nm, such as between 100 nm to 400 nm, between 150 nm to 350 nm, or between 200 nm to 300 nm.

The conformal outer layer 141 has, according to embodiments, a thickness that is less than or equal to 50 nm and greater than or equal to 5 nm, such as less than or equal to 40 nm and greater than or equal to 5 nm, less than or equal to 30 nm and greater than or equal to 5 nm, less than or equal to 20 nm and greater than or equal to 5 nm, less than or equal to 10 nm and greater than or equal to 5 nm, less than or equal to 50 nm and greater than or equal to 10 nm, less than or equal to 40 nm and greater than or equal to 10 nm, less than or equal to 30 nm and greater than or equal to 10 nm, less than or equal to 20 nm and greater than or equal to 10 nm, less than or equal to 50 nm and greater than or equal to 20 nm, less than or equal to 40 nm and greater than or equal to 20 nm, less than or equal to 30 nm and greater than or equal to 20 nm, less than or equal to 50 nm and greater than or equal to 30 nm, less than or equal to 40 nm and greater than or equal to 30 nm, or less than or equal to 50 nm and greater than or equal to 40 nm.

The conformal outer layer 141 may, in embodiments, be formed from silicon dioxide ($SiO_2$) $MgF_2$, KBr, ZnO, $Al_2O_3$, and may be applied to the conformal absorber layer 130 by CVD, PVD, wet chemical methods, or ALD.

In one or more embodiments, each of the core layer 110, the first conformal dielectric layer 120, the conformal absorber layer 130, and the second conformal dielectric layer 140 individually has a pore volume that is less than or equal to 0.030 $cm^3$/g, such as less than or equal to 0.025 $cm^3$/g, less than or equal to 0.020 $cm^3$/g, or less than or equal to 0.015 $cm^3$/g. In embodiments, each of the core layer 110, the first conformal dielectric layer 120, the conformal absorber layer 130, and the second conformal dielectric layer 140 individually has a pore volume that is less than or equal to 0.010 $cm^3$/g, such as less than or equal to 0.009 $cm^3$/g, less than or equal to 0.008 $cm^3$/g, less than or equal to 0.007 $cm^3$/g, less than or equal to 0.006 $cm^3$/g, less than or equal to 0.005 $cm^3$/g pore volume, less than or equal to 0.004 $cm^3$/g, less than or equal to 0.003 $cm^3$/g, less than or equal to 0.002 $cm^3$/g, less than or equal to 0.001 $cm^3$/g. It should be understood that in embodiments one or more of the core layer 110, the first conformal dielectric layer 120, the conformal absorber layer 130, and the second conformal dielectric layer 140 may have the same pore volume and in other embodiments one or more of the core layer 110, the first conformal dielectric layer 120, the conformal absorber layer 130, and the second conformal dielectric layer 140 may have different pore volume.

In one or more embodiments the surface area of the each of the core layer 110, the first conformal dielectric layer 120, the conformal absorber layer 130, and the second conformal dielectric layer 140 individually is less than or equal to 100 square meters per gram ($m^2$/g), such as less than or equal to 90 $m^2$/g, less than or equal to 85 $m^2$/g, less than or equal to 80 $m^2$/g, less than or equal to 75 $m^2$/g, less than or equal to 70 $m^2$/g, less than or equal to 65 $m^2$/g, less than or equal to 60 $m^2$/g, less than or equal to 55 $m^2$/g, less than or equal to 50 $m^2$/g, less than or equal to 45 $m^2$/g, less than or equal to 40 $m^2$/g, less than or equal to 35 $m^2$/g, less than or equal to 30 $m^2$/g, less than or equal to 25 $m^2$/g, less than or equal to 20 $m^2$/g, or less than or equal to 15 $m^2$/g. The surface area, in embodiments, of the each of the core layer 110, the first conformal dielectric layer 120, the conformal absorber layer 130, and the second conformal dielectric layer 140 individually is less than or equal to 10 $m^2$/g, such as less than or equal to 9 $m^2$/g, less than or equal to 8 $m^2$/g, less than or equal to 7 $m^2$/g, less than or equal to 6 $m^2$/g, less than or equal to 5 $m^2$/g, less than or equal to 4 $m^2$/g, less than or equal to 3 $m^2$/g, less than or equal to 2 $m^2$/g, or less than or equal to 1 $m^2$/g. Accordingly, in embodiments, each of the layers may individually have a surface area from 2 $m^2$/g to 10 $m^2$/g, from 3 $m^2$/g to 10 $m^2$/g, from 3 $m^2$/g to 8 $m^2$/g, from 5 $m^2$/g to 8 $m^2$/g, from 1 $m^2$/g to 3 $m^2$/g, from 3 $m^2$/g to 5 $m^2$/g, from 2 $m^2$/g to 3 $m^2$/g, from 1 $m^2$/g to 2 $m^2$/g, or from 0.5 $m^2$/g to 1 $m^2$/g. It should be understood that in embodiments one or more of the core layer 110, the first conformal dielectric layer 120, the conformal absorber layer 130, and the second conformal dielectric layer 140 may have the same surface area and in other embodiments one or more of the core layer 110, the first conformal dielectric layer 120, the conformal absorber layer 130, and the second conformal dielectric layer 140 may have different surface areas.

The isotherms were collected using nitrogen physisorption at 76 K to obtain the specific surface area (SSA) of the materials, by fitting 13 points collected from $P/P_0 \approx 0.06$-0.3 to the Brunauer-Emmett-Teller (BET) equation. Additional adsorption points were collected at various $P/P_0$, up to $P/P_0 \approx 0.95$, followed by desorption back to $P/P_0 \approx 0.06$. The total pore volume was determined by the volume of nitrogen adsorbed at $P/P_0$ 0.95, and average pore diameter was calculated using the Barrett Joyner Halenda (BJH) method.

In embodiments, the multilayer structure may have a $D_{50}$ diameter measured by the BET equation the amount of adsorbed gas, which build up one monolayer on the surface, can be calculated from the measured isotherm. The amount of molecules in this monolayer multiplied by the required space of one molecule gives the BET $D_{50}$ that is from 1 μm to 500 μm, such as from 10 μm to 500 μm, from 20 μm to 500 μm, from 25 μm to 500 μm, from 50 μm to 500 μm, from 100 μm to 500 μm, from 150 μm to 500 μm, from 200 μm to 500 μm, from 250 μm to 500 μm, from 300 μm to 500 μm, from 350 μm to 500 μm, from 400 μm to 500 μm, from 450 μm to 500 μm, from 5 μm to 450 μm, from 10 μm to 450 μm, from 20 μm to 450 μm, from 25 μm to 450 μm, from 50 μm to 450 μm, from 100 μm to 450 μm, from 150 μm to 450 μm, from 200 μm to 450 μm, from 250 μm to 450 μm, from 300 μm to 450 μm, from 350 μm to 450 μm, from 400 μm to 450 μm, from 5 μm to 400 μm, from 10 μm to 400 μm, from 20 μm to 400 μm, from 25 μm to 400 μm, from 50 μm to 400 μm, from 100 μm to 400 μm, from 150 μm to 400 μm, from 200 μm to 400 μm, from 250 μm to 400 μm, from 300 μm to 400 μm, from 350 μm to 400 μm, from 5 μm to 350 μm, from 10 μm to 350 μm, from 20 μm to 350 μm, from 25 μm to 350 μm, from 50 μm to 350 μm, from 100 μm to 350 μm, from 150 μm to 350 μm, from 200 μm to 350 μm, from 250 μm to 350 μm, from 300 μm to 350 μm, from 5 μm to 300 μm, from 10 μm to 300 μm, from 20 μm to 300 μm, from 25 μm to 300 μm, from 50 μm to 300 μm, from 100 μm to 300 μm, from 150 μm to 300 μm, from 200 μm to 300 μm, from 250 μm to 300 μm, from 5 μm to 250 μm, from 10 μm to 250 μm, from 20 μm to 250 μm, from 25 μm to 250 μm, from 50 μm to 250 μm, from 100 μm to 250 μm, from 150 μm to 250 μm, from 200 μm to 250 μm, from 5 μm to 200 μm, from 10 μm to 200 μm, from 20 μm to 200 μm, from 25 μm to 200 μm, from 50 μm to 200 μm, from 100 μm to 200 μm, from 150 μm to 200 μm, from 5 μm to 150 μm, from 10 μm to 150 μm, from 20 μm to 150 μm, from 25 μm to 150 μm, from 50 μm to 150 μm, from 100 μm to 150 μm, from 5 μm to 100 μm, from 10 μm to 100 μm, from 20 μm to 100 μm, from 25 μm to 100 μm, from 50 μm to 100 μm, from 5 μm to 50 μm, from 10 μm to 50 μm, from 20 μm to 50 μm, from 25 μm to 50 μm, from 5 μm to 25 μm, from 10 μm to 25 μm, from 20 μm to 25 μm, from 5 μm to 20 μm, from 10 μm to 20 μm, or from 5 μm to 10 μm.

The aspect ratio of the multilayer structures according to embodiments disclosed and described herein is from 1 to 100 as measure by electron microscope (TEM, SEM), with both cross-section and surface being measured, based on a large population of flakes, such as from 5 to 100, from 10 to 100, from 20 to 100, from 30 to 100, from 40 to 100, from 50 to 100, from 60 to 100, from 70 to 100, from 80 to 100, from 90 to 100, from 5 to 90, from 10 to 90, from 20 to 90, from 30 to 90, from 40 to 90, from 50 to 90, from 60 to 90, from 70 to 90, from 80 to 90, from 5 to 80, from 10 to 80, from 20 to 80, from 30 to 80, from 40 to 80, from 50 to 80, from 60 to 80, from 70 to 80, from 5 to 70, from 10 to 70, from 20 to 70, from 30 to 70, from 40 to 70, from 50 to 70, from 60 to 70, from 5 to 60, from 10 to 60, from 20 to 60, from 30 to 60, from 40 to 60, from 50 to 60, from 5 to 50, from 10 to 50, from 20 to 50, from 30 to 50, from 40 to 50, from 5 to 40, from 10 to 40, from 20 to 40, from 30 to 40, from 10 to 40, from 20 to 40, from 30 to 40, from 5 to 30, from 10 to 30, from 20 to 30, from 5 to 20, from 10 to 20, or from 5 to 10.

Embodiments of the multilayer structure 100 described above have a hue shift of less than 30°, such as less than 25°, less than 20°, less than 15°, or less than 10° in the Lab color space when viewed at angles from 0° to 45°.

In one or more embodiments, the multilayer structure 100 comprises a reflective core layer 110 made from Al, a conformal protective layer 111 made from $SiO_2$ encapsulating the reflective core layer 110, a conformal dielectric layer 120 made from $TiO_2$ encapsulating the conformal protective layer 111, a conformal barrier layer 121 made from $Al_2O_3$ encapsulating the conformal dielectric layer 120, and a conformal metallic absorber layer 130 made from W encapsulating the conformal barrier layer 121.

In one or more embodiments, the multilayer structure 100 comprises a reflective core layer 110 made from Al, a first conformal protective layer 111 made from $SiO_2$ encapsulating the reflective core layer 110, a first conformal dielectric layer 120 made from $TiO_2$ encapsulating the conformal protective layer 111, a conformal barrier layer 121 made from $Al_2O_3$ encapsulating the conformal dielectric layer 120, a conformal metallic absorber layer 130 made from W encapsulating the conformal barrier layer 121, a second conformal barrier layer 131 made from $SiO_2$ or $Al_2O_3$ encapsulating the conformal metallic absorber layer 130, and a second conformal dielectric layer 140 made from $TiO_2$ encapsulating the second conformal barrier layer 131.

In one or more embodiments, the multilayer structure 100 comprises a reflective core layer 110 made from Al, a first conformal protective layer 111 made from $SiO_2$ encapsulating the reflective core layer 110, a first conformal dielectric layer 120 made from $TiO_2$ encapsulating the conformal protective layer 111, a conformal barrier layer 121 made from $Al_2O_3$ encapsulating the conformal dielectric layer 120, a conformal metallic absorber layer 130 made from W encapsulating the conformal barrier layer 121, a second conformal barrier layer 131 made from $SiO_2$ or $Al_2O_3$ encapsulating the conformal metallic absorber layer, a second conformal dielectric layer 140 made from $TiO_2$ encapsulating the second conformal barrier layer 131, and a conformal outer layer 141 made from $SiO_2$ encapsulating the second conformal dielectric layer.

In one or more embodiments, the multilayer structure 100 comprises a reflective core layer 110 made from Al, a conformal protective layer 111 made from $SiO_2$ encapsulating the reflective core layer 110, a conformal dielectric layer 120 made from $Fe_2O_3$ encapsulating the conformal protective layer 111, a conformal barrier layer 121 made from $Al_2O_3$ encapsulating the conformal dielectric layer 120, and a conformal metallic absorber layer 130 made from W encapsulating the conformal barrier layer 121.

In one or more embodiments, the multilayer structure 100 comprises a reflective core layer 110 made from Al, a first conformal protective layer 111 made from $SiO_2$ encapsulating the reflective core layer 110, a first conformal dielectric layer 120 made from $Fe_2O_3$ encapsulating the conformal protective layer 111, a conformal barrier layer 121 made from $Al_2O_3$ encapsulating the conformal dielectric layer 120, a conformal metallic absorber layer 130 made from W encapsulating the conformal barrier layer 121, a second conformal barrier layer 131 made from $SiO_2$ or $Al_2O_3$ encapsulating the conformal metallic absorber layer, and a second conformal dielectric layer 140 made from $Fe_2O_3$ or $TiO_2$ encapsulating the second conformal barrier layer 131.

In one or more embodiments, the multilayer structure 100 comprises a reflective core layer 110 made from Al, a first conformal protective layer 111 made from $SiO_2$ encapsulating the reflective core layer 110, a first conformal dielectric layer 120 made from $Fe_2O_3$ encapsulating the conformal protective layer 111, a conformal barrier layer 121 made from $Al_2O_3$ encapsulating the conformal dielectric layer 120, a conformal metallic absorber layer 130 made from W encapsulating the conformal barrier layer 121, a second conformal barrier layer 131 made from $SiO_2$ or $Al_2O_3$ encapsulating the conformal metallic absorber layer, a second conformal dielectric layer 140 made from $Fe_2O_3$ or $TiO_2$ encapsulating the second conformal barrier layer 131, and a conformal outer layer 141 made from $SiO_2$ encapsulating the second conformal dielectric layer.

The multilayer structures in embodiments disclosed herein can be used as pigments (e.g., paint pigments for a paint used to paint an object), or a continuous thin film applied to an object. When used as pigments, at least one of paint binders and fillers can be used and mixed with the pigments to provide a paint that displays a high chroma structural color. In addition, other additives may be added to the multilayer structure to aid the compatibility of multilayer structure in the paint system. Exemplary compatibility-enhancing additives include silane surface treatments that coat the exterior of the multilayer structure and improve the compatibility of multilayer structure in the paint system. Such paint systems or films can be used on any article, including an automotive vehicle.

A first aspect includes multilayer structure that reflects color comprising: a core layer; a conformal dielectric layer encapsulating the core layer; a conformal barrier layer encapsulating the conformal dielectric layer; and a conformal absorber layer encapsulating the conformal barrier layer.

A second aspect includes the multilayer structure of the first aspect, further comprising a conformal protective layer encapsulating the core layer.

A third aspect includes, the multilayer structure of first or second aspect, further comprising: a second conformal barrier layer encapsulating the conformal absorber layer; and a second conformal dielectric layer encapsulating the second conformal barrier layer.

A fourth aspect includes, the multilayer structure of any of the first to third aspects, wherein the multilayer structure reflects a single narrow band of visible light when exposed to broadband electromagnetic radiation, the single narrow band of visible light comprising: a color shift of the single narrow band of visible light is less than 30° measured in Lab color space when the multilayer structure is exposed to broadband electromagnetic radiation and viewed from angles between 0° and 45° relative to a direction normal to an outer surface of the multilayer structure.

A fifth aspect includes, the multilayer structure of any of the first to fourth aspects, wherein the core layer has a thickness between 20 nm and 100 μm.

A sixth aspect includes, the multilayer structure of any of the first to fifth aspects, wherein the conformal dielectric layer is formed from $TiO_2$, ZnS, $ZrO_2$, $HfO_2$, $Fe_3O_4$, AlAs, $Fe_2O_3$, PbS, GaAs, InAs, $SiO_2$, $MgF_2$, KBr, ZnO, or $Al_2O_3$, and the conformal dielectric layer has a thickness between 5 nm and 500 nm.

A seventh aspect includes, the multilayer structure of any of the first to sixth aspects, wherein the conformal absorber layer is formed from W, Cr, Ge, Ni, stainless steel, Pd, Ti, Si, V, TiN, Co, Mo, Nb, ferric oxide, or combinations thereof and the conformal metallic absorber layer has a thickness between 2 nm and 50 nm.

An eighth aspect includes, the multilayer structure of any of the first to seventh aspects, wherein the conformal barrier layer is formed from $Al_2O_3$, $SiO_2$, $MgF_2$, KBr, or ZnO, and the conformal barrier layer has a thickness that is that is less than or equal to 50 nm.

A ninth aspect includes, the multilayer structure of any of the third to eighth aspects, wherein the second conformal dielectric layer is formed from $TiO_2$, ZnS, $ZrO_2$, $HfO_2$, $Fe_3O_4$, AlAs, $Fe_2O_3$, PbS, GaAs, InAs, $SiO_2$, $MgF_2$, KBr, ZnO, or $Al_2O_3$ and has a thickness between 5 nm and 500 nm, the conformal protective layer is formed from $SiO_2$, $MgF_2$, KBr, ZnO, or $Al_2O_3$, and has a thickness that is less than or equal to 50 nm, and the second conformal barrier layer is formed from $SiO_2$, $MgF_2$, KBr, ZnO, or $Al_2O_3$, and has a thickness that is less than or equal to 50 nm.

A tenth aspect includes, the multilayer structure of any of the first to ninth aspects, wherein the core layer is formed from Al, the conformal dielectric layer is formed from $TiO_2$ or $Fe_2O_3$, the conformal barrier layer is formed from $Al_2O_3$, and the conformal absorber layer is formed from W.

A eleventh aspect includes, the multilayer structure of any of the first to ninth aspects, wherein the core layer is formed from Al, the conformal protective layer is formed from $SiO_2$, the conformal dielectric layer is formed from $TiO_2$ or $Fe_2O_3$, the conformal barrier layer is formed from $Al_2O_3$, the conformal metallic absorber layer is formed from W, the second conformal barrier layer is formed from $SiO_2$ or $Al_2O_3$, and the second conformal dielectric layer is formed from $TiO_2$ or $Fe_2O_3$.

A twelfth aspect includes, the multilayer structure of any of the first to eleventh aspects, wherein each of the core layer, the conformal dielectric layer, and the conformal absorber layer individually has a pore volume that is less than or equal to 0.030 $cm^3/g$.

A thirteenth aspect includes, the multilayer structure of any of the first to twelfth aspects, wherein each of the core layer, the conformal dielectric layer, and the conformal absorber layer individually has a pore volume that is less than or equal to 0.005 $cm^3/g$.

A fourteenth aspect includes, the multilayer structure of any of the first to thirteenth aspects, wherein each of the core layer, the conformal dielectric layer, and the conformal absorber layer individually has a surface area less than or equal to 100 $m^2/g$.

A fifteenth aspect includes, the multilayer structure of any of the first to fourteenth aspects, wherein each of the core layer, the conformal dielectric layer, and the conformal absorber layer individually has a surface area less than or equal to 3 $m^2/g$.

A sixteenth aspect includes, the multilayer structure of any of the first to fifteenth aspects, wherein the multilayer structure has a $D_{50}$ diameter that is from 1 μm to 500 μm.

A seventeenth aspect includes, the multilayer structure of any of the first to sixteenth aspects, wherein the multilayer structure has an aspect ratio from 1 to 100.

An eighteenth aspect includes, a method for forming the multilayer structure of any of the first to seventeenth aspects, the method comprising: depositing the conformal dielectric layer onto the core layer by CVD or ALD; depositing the conformal barrier layer onto the conformal dielectric layer by ALD; and depositing the conformal absorber layer onto the conformal dielectric layer by ALD.

A nineteenth aspect includes a paint system comprising: a binder; and a multilayer structure of any of the first to seventeenth aspects.

A twentieth aspect includes an automotive vehicle comprising the paint system of the nineteenth aspect.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

EXAMPLES

Embodiments will be further clarified by the following examples.

As noted above, high volume ALD production can result in overlap of adjacent dielectric and absorber layers that can result in degraded optical properties of the multilayer structure. It is believed that this overlap occurs because of the high porosity of the dielectric layer (such as a $TiO_2$ layer), which allows overlap with the absorber layer (such as W layer) applied by ALD as the metal can be impregnated into the pores of the dielectric layer. With barrier or protective layer, all the layers are well separated, so their optical properties are well predicted by simulation.

Example 1

A multilayer structure was formed using ALD process. The multilayer structure included an aluminum reflective core layer, a conformal $SiO_2$ first protective layer encapsulating the reflective core layer, a conformal $TiO_2$ dielectric layer encapsulating the conformal $SiO_2$ first protective layer, a conformal $Al_2O_3$ barrier layer encapsulating the conformal $TiO_2$ dielectric layer, and a conformal W metallic absorber layer encapsulating the conformal $Al_2O_3$ barrier layer.

Figure 6A:
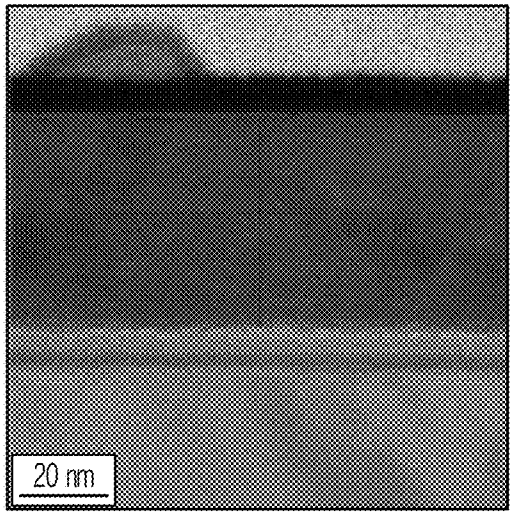
FIG. 6A is a transmission electron microscope (TEM) image of a multilayer structure having protective and barrier layers according to embodiments disclosed and described herein.
Figure 6B:
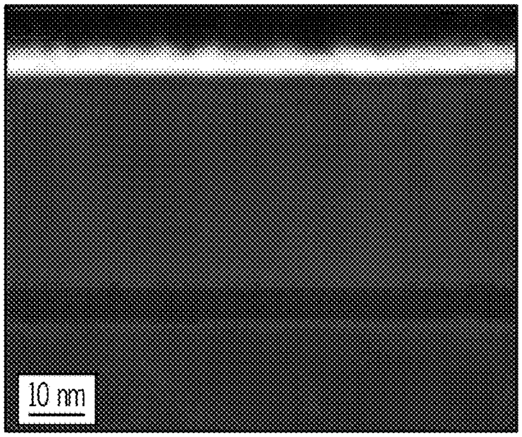
FIG. 6B is a further-magnified TEM image of a multilayer structure having protective and barrier layers according to embodiments disclosed and described herein.
Figure 6C:
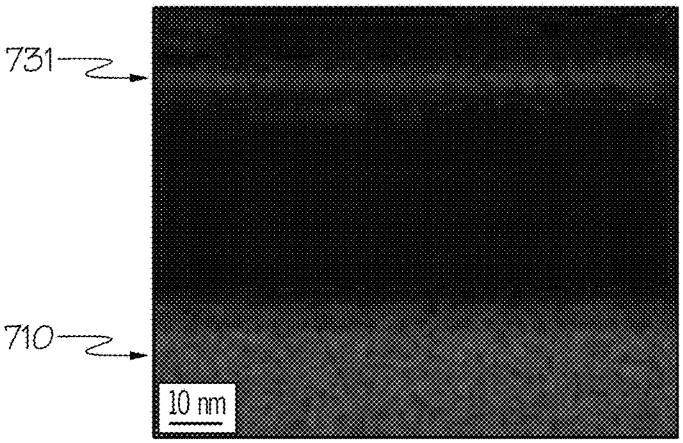
FIG. 6C is a TEM image of a multilayer structure having protective and barrier layers according to embodiments disclosed and described herein with elemental aluminum highlighted.
Figure 6D:
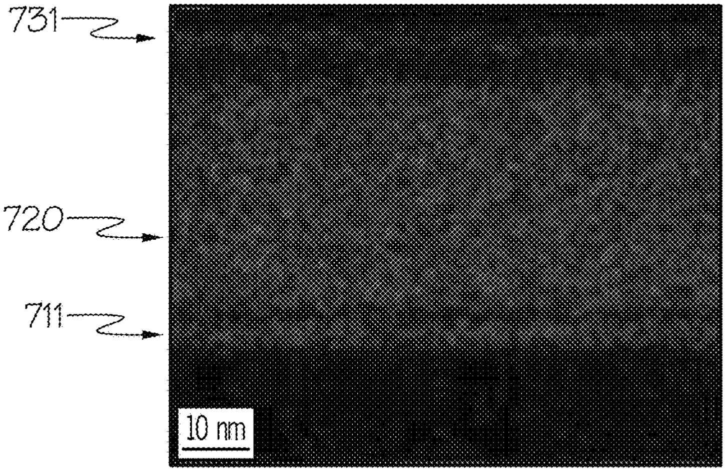
FIG. 6D is a TEM image of a multilayer structure having protective and barrier layers according to embodiments disclosed and described herein with elemental oxygen highlighted.
Figure 6E:
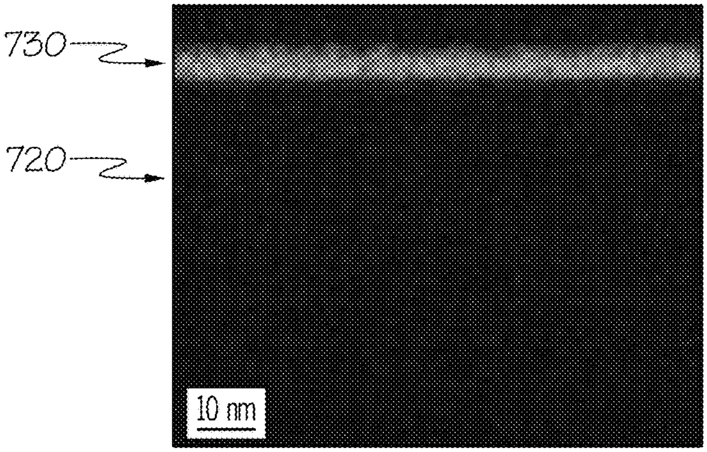
FIG. 6E is a TEM image of a multilayer structure having protective and barrier layers according to embodiments disclosed and described herein with elemental tungsten highlighted.
Figure 6F:
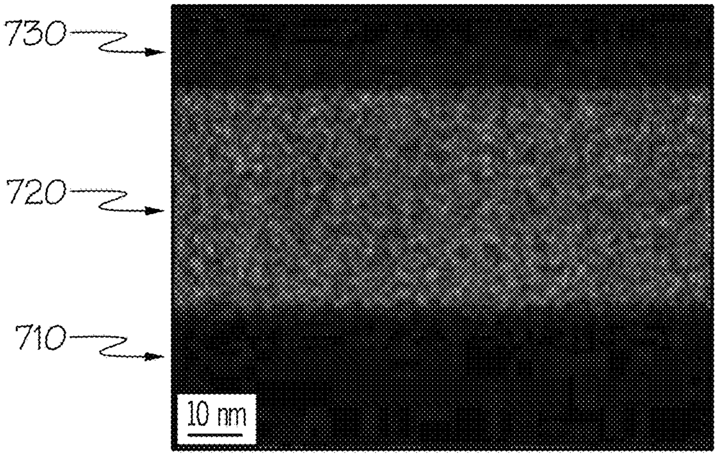
FIG. 6F is a TEM image of a multilayer structure having protective and barrier layers according to embodiments disclosed and described herein with elemental titanium highlighted.

FIG. 6A is a TEM image of the as-formed multilayer structure. As shown in FIG. 6A, each layer is distinct, separate, and has a smooth surface. FIG. 6B is a further-magnified TEM image of the as-formed multilayer structure and further shows the distinct, separate, and smooth layers. FIG. 6C is a TEM image with the elemental aluminum highlighted. FIG. 6C shows that the Al reflective core layer 710 is very distinct and has a smooth surface, and it also shows a distinct $Al_2O_3$ barrier layer 731, both of which have smooth surfaces. FIG. 6D is a TEM image with elemental oxygen highlighted. FIG. 6D shows a distinct $SiO_2$ protective layer 711, a distinct $TiO_2$ dielectric layer 720, and a distinct $Al_2O_3$ barrier layer 731 that all have smooth surfaces and there is not significant overlap between the various oxygen-containing layers. FIG. 6E is a TEM image with elemental tungsten highlighted. As shown in FIG. 6E, the W absorber layer 730 is distinct and has smooth surfaces. FIG. 6E also shows there is no infiltration of tungsten into the $TiO_2$ dielectric layer 720. FIG. 6F is a TEM image with elemental titanium highlighted. FIG. 6F shows a distinct $TiO_2$ dielectric layer 720 with smooth surfaces and no infiltration of $TiO_2$ into either the Al reflective core layer 710 or the W absorber layer 730.

Comparative Example 1

A multilayer structure was formed using ALD process. The multilayer structure included an aluminum reflective core layer, a conformal $SiO_2$ first protective layer encapsulating the reflective core layer, a conformal $TiO_2$ dielectric layer encapsulating the conformal $SiO_2$ first protective layer, and a conformal W metallic absorber layer encapsulating the conformal $TiO_2$ dielectric layer. There is no barrier layer present between the $TiO_2$ dielectric layer and the W absorber layer.

Figure 7A:
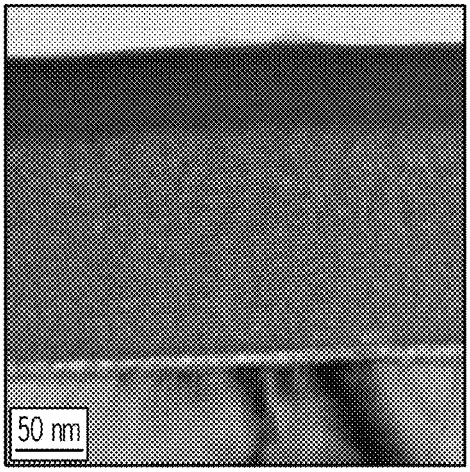
FIG. 7A is a TEM image of a multilayer structure without a barrier layer.
Figure 7B:
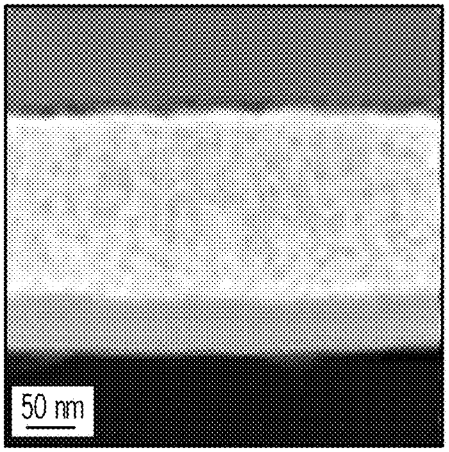
FIG. 7B is a further-magnified TEM image of a multilayer structure without a barrier layer.
Figure 7C:
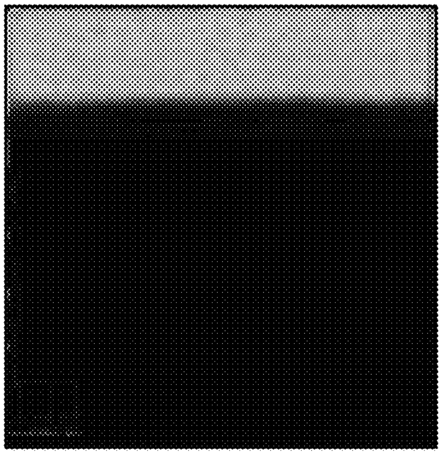
FIG. 7C is a TEM image of a multilayer structure without a barrier layer with elemental aluminum highlighted.
Figure 7D:
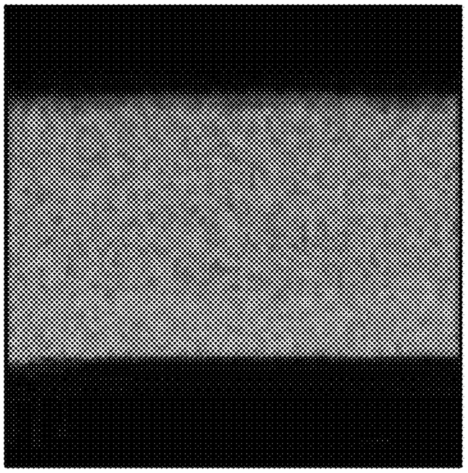
FIG. 7D is a TEM image of a multilayer structure without a barrier layer with elemental oxygen highlighted.
Figure 7E:
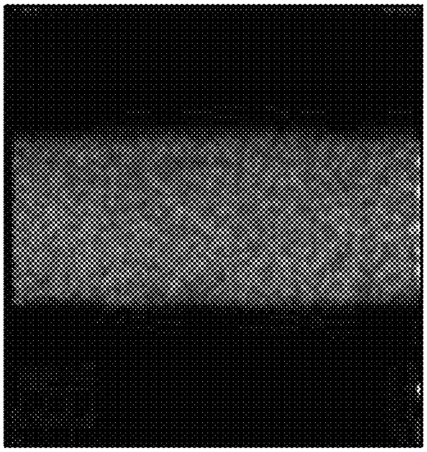
FIG. 7E is a TEM image of a multilayer structure without a barrier layer with elemental tungsten highlighted.
Figure 7F:
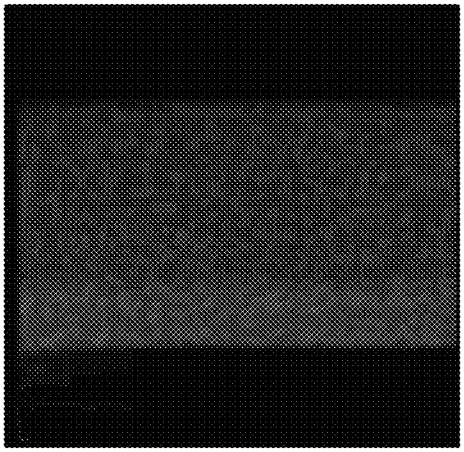
FIG. 7F is a TEM image of a multilayer structure without a barrier layer with elemental titanium highlighted.

FIG. 7A is a TEM image of the as-formed multilayer structure. As shown in FIG. 7A, tungsten from the W absorber layer infiltrated into the $TiO_2$ dielectric layer. FIG. 7B is a further-magnified TEM image of the as-formed multilayer structure and further shows the infiltration of W into the $TiO_2$ dielectric layer. FIG. 7C is a TEM image with the elemental aluminum highlighted. FIG. 7C shows that the Al reflective core layer 710 is very distinct and has a smooth surface, partially provided by the $SiO_2$ protective layer. FIG. 7D is a TEM image with elemental oxygen highlighted. FIG. 7D shows a denser oxygen concentration at the bottom of the $TiO_2$ dielectric layer (i.e., nearer the Al reflective core layer) where less tungsten was able to infiltrate. FIG. 7E is a TEM image with elemental tungsten highlighted. As shown in FIG. 7E, there is no protective layer and W infiltrated into the $TiO_2$. FIG. 7F is a TEM image with elemental titanium highlighted. FIG. 7F shows a higher concentration of Ti at the bottom of the $TiO_2$ dielectric layer (i.e., nearer the Al reflective core layer) where less tungsten was able to infiltrate.

As Example 1 and Comparative Example 1 above show, by depositing an $Al_2O_3$ barrier layer between the $TiO_2$ dielectric layer and the W absorber layer, the multilayer structure has well-separated dielectric and absorber layers that give rise to multilayer structure with improved chromaticity compared to a multilayer structure where no barrier layer is present between the $TiO_2$ dielectric layer and the W absorber layer.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A multilayer structure that reflects color comprising:
- a core layer;
- a conformal dielectric layer encapsulating the core layer;
- a conformal barrier layer encapsulating the conformal dielectric layer; and
- a conformal absorber layer encapsulating the conformal barrier layer, wherein the multilayer structure reflects a single narrow band of visible light when exposed to broadband electromagnetic radiation, the single narrow band of visible light comprising:
- a color shift of the single narrow band of visible light is less than 30° measured in Lab color space when the multilayer structure is exposed to broadband electromagnetic radiation and viewed from angles between 0° and 45° relative to a direction normal to an outer surface of the multilayer structure.

2. The multilayer structure of claim 1, further comprising a conformal protective layer encapsulating the core layer.

3. The multilayer structure of claim 2, further comprising:
- a second conformal barrier layer encapsulating the conformal absorber layer; and
- a second conformal dielectric layer encapsulating the second conformal barrier layer.

4. The multilayer structure of claim 1, wherein the core layer has a thickness between 20 nm and 100 μm.

5. The multilayer structure of claim 1, wherein
- the conformal dielectric layer is formed from $TiO_2$, ZnS, $ZrO_2$, $HfO_2$, $Fe_3O_4$, AlAs, $Fe_2O_3$, PbS, GaAs, InAs, $SiO_2$, $MgF_2$, KBr, ZnO, or $Al_2O_3$, and
- the conformal dielectric layer has a thickness between 5 nm and 500 nm.

6. The multilayer structure of claim 1, wherein
- the conformal absorber layer is formed from W, Cr, Ge, Ni, stainless steel, Pd, Ti, Si, V, TiN, Co, Mo, Nb, ferric oxide, or combinations thereof, and
- the conformal absorber layer has a thickness between 2 nm and 50 nm.

7. The multilayer structure of claim 1, wherein
- the conformal barrier layer is formed from $Al_2O_3$, $SiO_2$, $MgF_2$, KBr, or ZnO, and
- the conformal barrier layer has a thickness that is that is less than or equal to 50 nm.

8. The multilayer structure of claim 3, wherein
- the second conformal dielectric layer is formed from $TiO_2$, ZnS, $ZrO_2$, $HfO_2$, $Fe_3O_4$, AlAs, $Fe_2O_3$, PbS, GaAs, InAs, $SiO_2$, $MgF_2$, KBr, ZnO, or $Al_2O_3$ and has a thickness between 5 nm and 500 nm,
- the conformal protective layer is formed from $SiO_2$, $MgF_2$, KBr, ZnO, or $Al_2O_3$, and has a thickness that is less than or equal to 50 nm, and
- the second conformal barrier layer is formed from $SiO_2$, $MgF_2$, KBr, ZnO, or $Al_2O_3$, and has a thickness that is less than or equal to 50 nm.

9. The multilayer structure of claim 1, wherein
- the core layer is formed from Al,
- the conformal dielectric layer is formed from $TiO_2$ or $Fe_2O_3$,
- the conformal barrier layer is formed from $Al_2O_3$, and
- the conformal absorber layer is formed from W.

10. The multilayer structure of claim 3, wherein
- the core layer is formed from Al,
- the conformal protective layer is formed from $SiO_2$ or $Al_2O_3$,
- the conformal dielectric layer is formed from $TiO_2$ or $Fe_2O_3$,
- the conformal barrier layer is formed from $Al_2O_3$,
- the conformal absorber layer is formed from W,
- the second conformal barrier layer is formed from $SiO_2$ or $Al_2O_3$, and
- the second conformal dielectric layer is formed from $TiO_2$ or $Fe_2O_3$.

11. The multilayer structure of claim 1, wherein each of the core layer, the conformal dielectric layer, and the conformal absorber layer individually has a pore volume that is less than or equal to 0.030 $cm^3/g$.

12. The multilayer structure of claim 1, wherein each of the core layer, the conformal dielectric layer, and the conformal absorber layer individually has a pore volume that is less than or equal to 0.005 $cm^3/g$.

13. The multilayer structure of claim 1, wherein each of the core layer, the conformal dielectric layer, and the conformal absorber layer individually has a surface area less than or equal to 100 $m^2/g$.

14. The multilayer structure of claim 1, wherein each of the core layer, the conformal dielectric layer, and the conformal absorber layer individually has a surface area less than or equal to 5 $m^2/g$.

15. The multilayer structure of claim 1, wherein the multilayer structure has a $D_{50}$ diameter that is from 1 μm to 500 μm.

16. The multilayer structure of claim 1, wherein the multilayer structure has an aspect ratio from 1 to 100.

17. A method for forming the multilayer structure of claim 1, the method comprising:
- depositing the conformal dielectric layer onto the core layer by CVD or ALD;

depositing the conformal barrier layer onto the conformal dielectric layer by ALD; and depositing the conformal absorber layer onto the conformal dielectric layer by ALD.

18. A paint system comprising:

a binder; and a multilayer structure of claim 1.

19. An automotive vehicle comprising the paint system of claim 18.

* * * * *